(12) United States Patent
Abe et al.

(10) Patent No.: US 12,531,034 B2
(45) Date of Patent: *Jan. 20, 2026

(54) LIQUID CRYSTAL DISPLAYS WITH OPTICAL SENSORS

(71) Applicant: Magnolia White Corporation, Tokyo (JP)

(72) Inventors: Hiroyuki Abe, Tokyo (JP); Akihiko Saitoh, Tokyo (JP); Teppei Yamada, Tokyo (JP)

(73) Assignee: Magnolia White Corporation, Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 18/907,661

(22) Filed: Oct. 7, 2024

(65) Prior Publication Data

US 2025/0029571 A1    Jan. 23, 2025

Related U.S. Application Data

(63) Continuation of application No. 18/456,733, filed on Aug. 28, 2023, now Pat. No. 12,142,236.

(30) Foreign Application Priority Data

Aug. 29, 2022 (JP) .................. 2022-135825

(51) Int. Cl.
    *G09G 3/36*      (2006.01)
    *G06V 40/13*      (2022.01)

(52) U.S. Cl.
    CPC ....... *G09G 3/3607* (2013.01); *G06V 40/1318* (2022.01); *G09G 2354/00* (2013.01)

(58) Field of Classification Search
    CPC ............ G09G 3/3607; G09G 2354/00; G06V 40/1318
See application file for complete search history.

(56) References Cited

U.S. PATENT DOCUMENTS 12,142,236 B2 * 11/2024 Abe ..................... G09G 3/3607
2016/0013426 A1    1/2016 Yoshioka et al.
2020/0265207 A1    8/2020 Chu et al.
(Continued)

FOREIGN PATENT DOCUMENTS

JP      2022107203 A    7/2022
WO    2022149439 A1    7/2022

OTHER PUBLICATIONS

Office Action issued on Oct. 14, 2025, in corresponding Japanese Application No. 2022-135825, 8 pages.

*Primary Examiner* — Rodney Amadiz
(74) *Attorney, Agent, or Firm* — Maier & Maier, PLLC

(57) ABSTRACT

According to one embodiment, a liquid crystal display device with an optical sensor includes a display panel and a driver IC. The display panel includes first to third signal lines, an optical sensor including a photoelectric conversion element, and a sensor signal line that is connected to the optical sensor and transmits a detection signal to the driver IC. One first wiring line drawn from one terminal of the driver IC is connected to four switching elements. Three of the four switching elements are electrically connected to one of the first to third signal lines, respectively. One of the four switching elements, different from the three switching elements, is electrically connected to the sensor signal line.

11 Claims, 16 Drawing Sheets

(56) References Cited

U.S. PATENT DOCUMENTS

| | | |
|---|---|---|
| 2021/0034833 A1 | 2/2021 | Cheng et al. |
| 2021/0109639 A1 | 4/2021 | Hsieh et al. |
| 2022/0221954 A1 | 7/2022 | Ito et al. |
| 2022/0335743 A1 | 10/2022 | Shih et al. |
| 2023/0350252 A1 | 11/2023 | Koide |

* cited by examiner

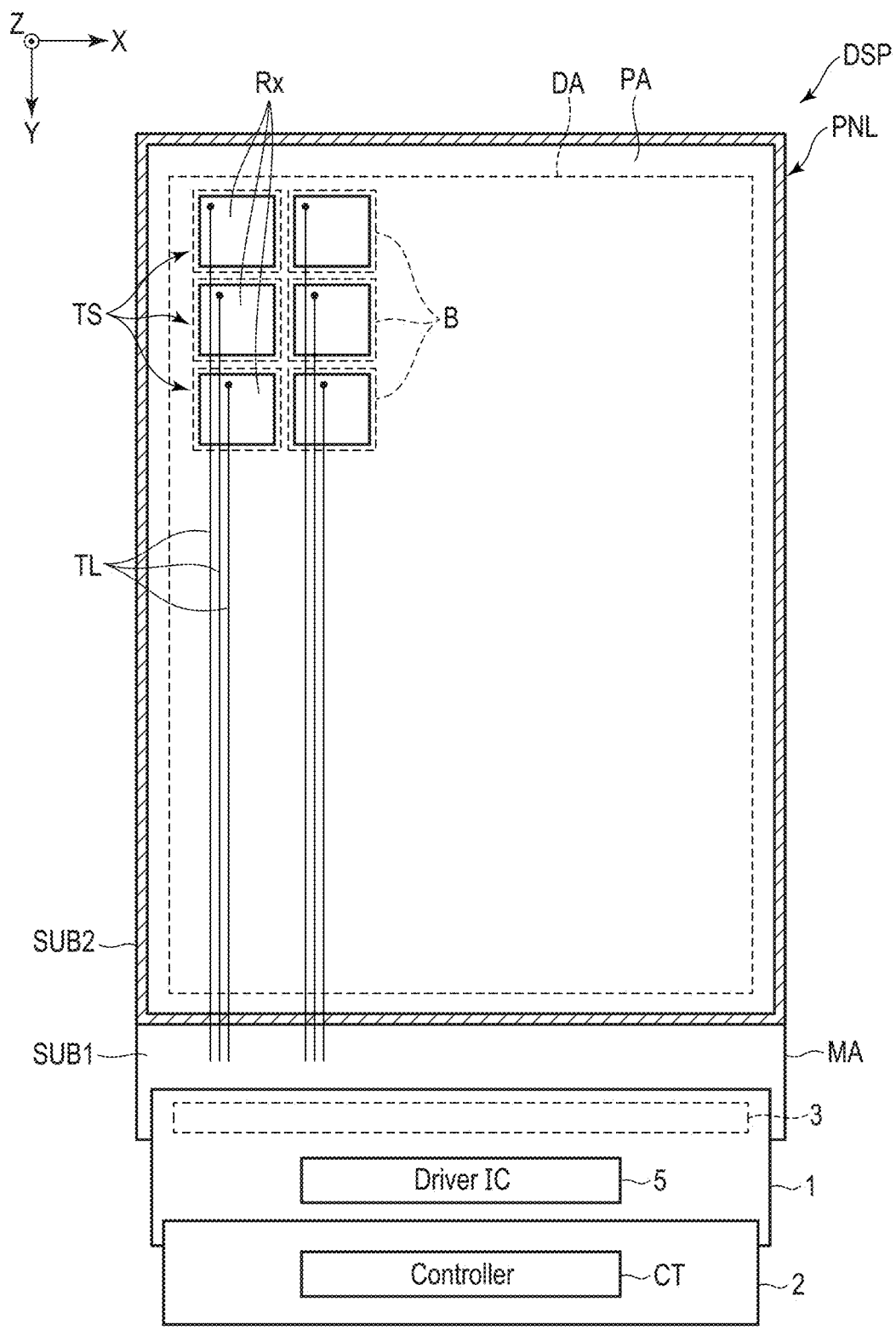
F I G. 3

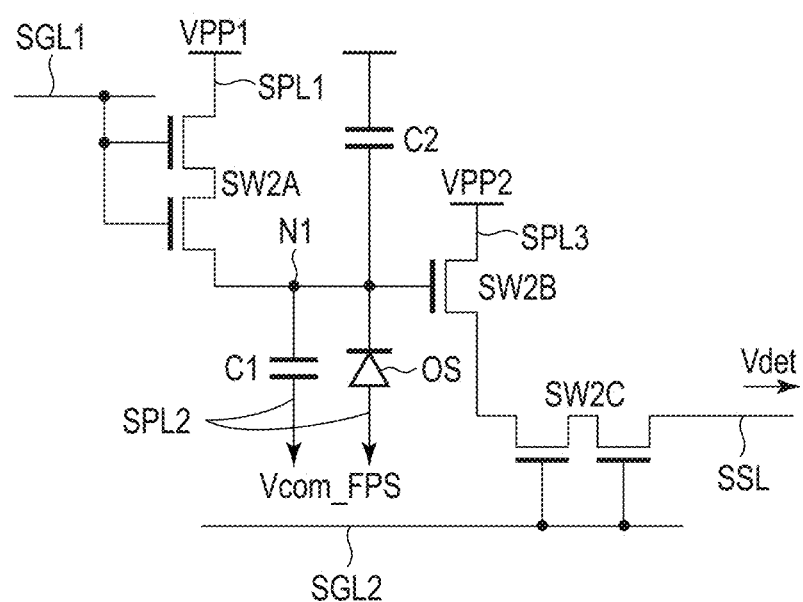
F I G. 4

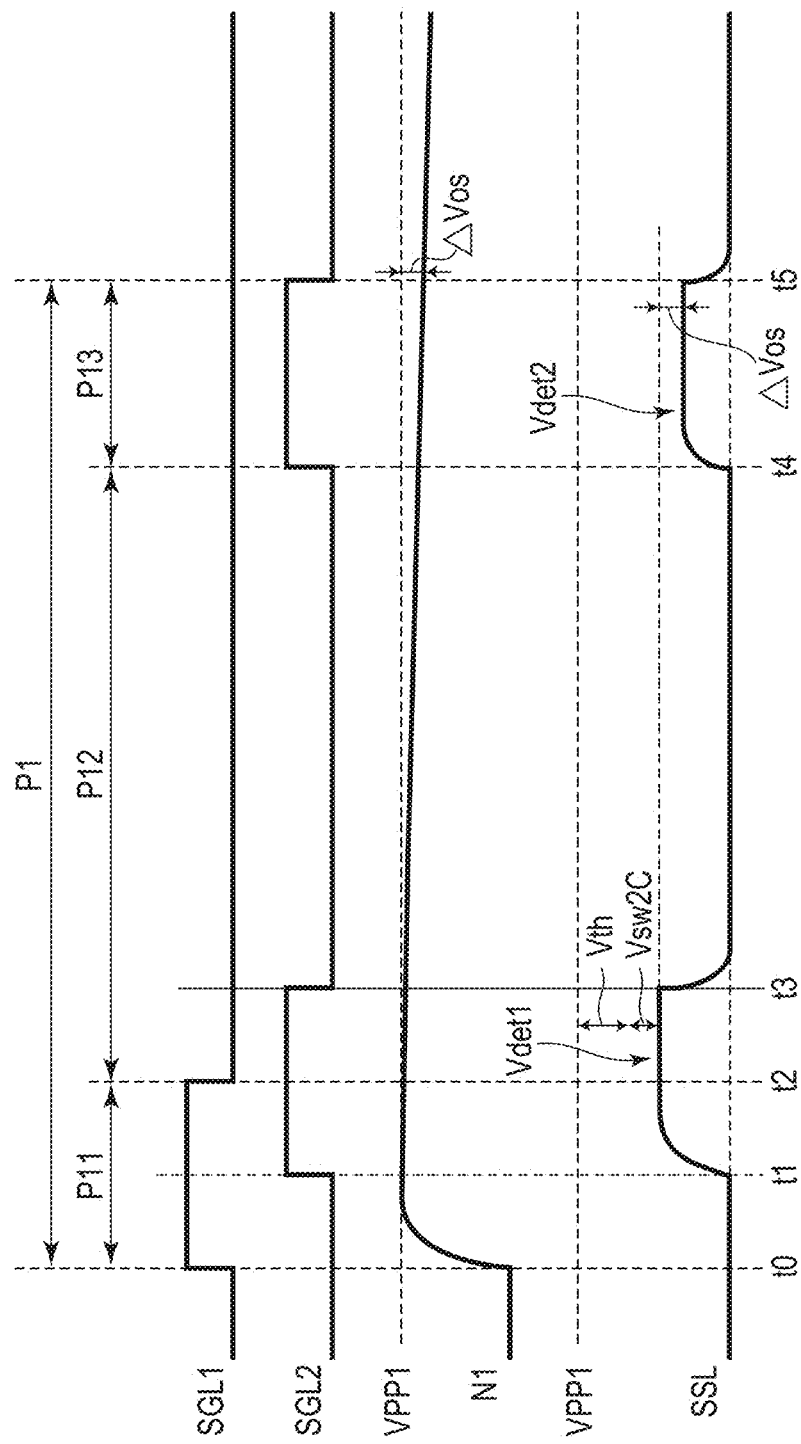
F I G. 5

LIQUID CRYSTAL DISPLAYS WITH OPTICAL SENSORS

CROSS-REFERENCE TO RELATED APPLICATIONS

The present application is a continuation of U.S. application Ser. No. 18/456,733, filed Aug. 28, 2023, which is based upon and claims the benefit of priority from Japanese Patent Application No. 2022-135825, filed Aug. 29, 2022, the entire contents of each of which are incorporated herein by reference.

FIELD

Embodiments described herein relate generally to a liquid crystal display device with an optical sensor.

BACKGROUND

In recent years, liquid crystal display devices (biometric devices) with built-in sensors that detect biometric information, such as fingerprint sensors and vein sensors, have been developed. Optical sensors using, for example, photoelectric conversion elements are used as this type of sensor. Optical sensors detect biometric information of an object by detecting light emitted from a light source such as a backlight and reflected by the object.

As a general liquid crystal display device is required to have a narrow frame, there is a demand for a narrow frame also in such liquid crystal display devices with optical sensors.

BRIEF DESCRIPTION OF THE DRAWINGS

FIG. 3 is a plan view showing a configuration example of a touch sensor mounted on the display device according to the embodiment.

FIG. 4 is an equivalent circuit diagram showing an optical sensor and a sensor circuit connected to the optical sensor according to the embodiment.

FIG. 5 illustrates an operation example of the optical sensor and the sensor circuit connected to the optical sensor according to the embodiment.

DETAILED DESCRIPTION

Figure 1:
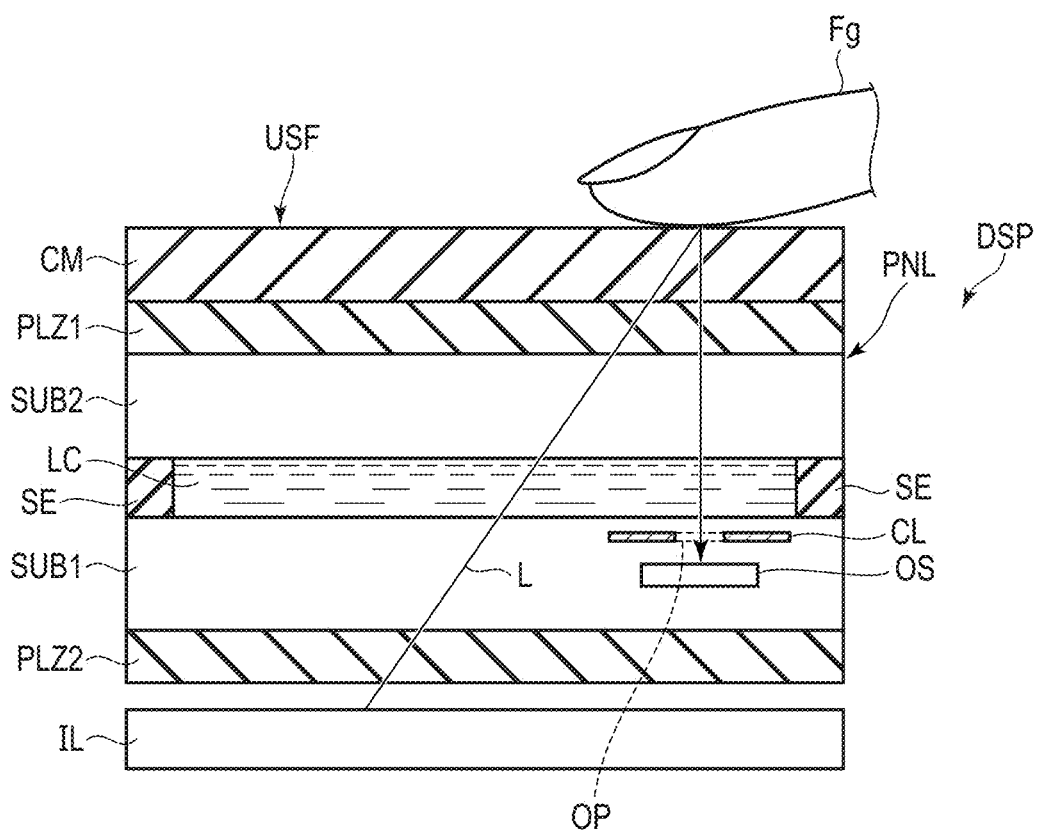
FIG. 1 schematically shows a display device according to one embodiment.

In general, according to one embodiment, a liquid crystal display device with an optical sensor comprises a display panel provided with a first substrate, a second substrate facing the first substrate, and a liquid crystal layer located between the first substrate and the second substrate, and a driver IC. The display panel includes a first signal line supplying a video signal to a first sub-pixel corresponding to red, a second signal line supplying a video signal to a second sub-pixel corresponding to green, a third signal line supplying a video signal to a third sub-pixel corresponding to blue, an optical sensor comprising a photoelectric conversion element that outputs a detection signal in response to light incident from the liquid crystal layer side, and a sensor signal line that is connected to the optical sensor and transmits the detection signal to the driver IC. One first wiring line drawn from one terminal of the driver IC is connected to four switching elements. Three of the four switching elements are electrically connected to one of the first signal line, the second signal line, and the third signal line, respectively. One of the four switching elements, different from the three switching elements, is electrically connected to the sensor signal line.

Embodiments will be described hereinafter with reference to the accompanying drawings.

The disclosure is merely an example, and proper changes within the spirit of the invention, which are easily conceivable by a skilled person, are included in the scope of the invention as a matter of course. In addition, in some cases, in order to make the description clearer, elements are schematically illustrated in the drawings, compared to the actual modes. However, the schematic illustration is merely an example, and adds no restrictions to the interpretation of the invention. Besides, in the specification and drawings, elements exercising the same or similar functions as those described in connection with preceding drawings are denoted by like reference numerals, and redundant detailed descriptions may be omitted.

Note that, in the drawings, an X-axis, Y-axis, and Z-axis that are orthogonal to each other are shown as necessary to facilitate understanding. A direction along the X-axis is referred to as an X-direction or first direction, a direction along the Y-axis is referred to as a Y-direction or second direction, and a direction along the Z-axis is referred to as a Z-direction, third direction, or thickness direction. A plane defined by the X and Y axes is referred to as an X-Y plane, and a plane defined by the X and Z axes is referred to as a X-Z plane. A view of observing the X-Y plane is referred to as a planar view.

FIG. 1 schematically shows a display device DSP according to one embodiment. As will be described in detail below, the display device DSP is a liquid crystal display device with an optical sensor, and may be referred to as a biometric device. The display device DSP comprises a display panel PNL, a cover member CM, a first polarizing plate PLZ1, a second polarizing plate PLZ2, and an illumination device IL.

The display panel PNL is a liquid crystal display panel and is provided with a first substrate SUB1, a second substrate SUB2 facing the first substrate SUB1, a sealing material SE, and a liquid crystal layer LC. The liquid crystal layer LC is sealed between the first substrate SUB1 and the second substrate SUB2 by the sealing material SE. The display panel PNL of the present embodiment is a transmissive display panel that displays images by selectively transmitting light from a rear side of the first substrate SUB1 to an upper side of the second substrate SUB2.

The first substrate SUB1 comprises an optical sensor OS and a collimating layer CL. The optical sensor OS is located between a main surface of the first substrate SUB1 facing the second polarizing plate PLZ2 and the collimating layer CL. The collimating layer CL has an opening OP that overlaps the optical sensor OS. The collimate layer CL is formed, for example, of a metallic material and has light-shielding properties. Such a collimating layer CL may be further arranged on the second substrate SUB2 as well as on the first substrate SUB1.

The sealing material SE adheres the first substrate SUB1 and the second substrate SUB2. A predetermined cell gap is formed between the first substrate SUB1 and the second substrate SUB2 by a spacer not shown. The liquid crystal layer LC is filled within this cell gap.

The cover member CM is provided on the display panel PNL. For example, a glass substrate or a resin substrate can be used as the cover member CM. The cover member CM has an upper surface USF with which an object to be detected by the optical sensor OS contacts. Note that, in the present embodiment, it is assumed that the upper surface USF of the cover member CM is parallel to the upper surface of the optical sensor OS. In the example of FIG. 1, a finger Fg, which is an example of an object, is in contact with the upper surface USF. The first polarizing plate PLZ1 is provided between the display panel PNL and the cover member CM.

The illumination device IL is provided under the display panel PNL and irradiates light L onto the first substrate SUB1. The illumination device IL is, for example, a side-edge type backlight and is provided with a plate-shaped light guide and a plurality of light sources that emit light on the side surfaces of this light guide. The second polarizing plate PLZ2 is provided between the display panel PNL and the illumination device IL.

Of the light L, a reflected light reflected by the finger Fg is incident on the optical sensor OS through the opening OP formed in the collimating layer CL. That is, the reflected light reflected by the finger Fg passes through the cover member CM, the first polarizing plate PLZ1, the second substrate SUB2, the liquid crystal layer LC, and, further, a portion of the first substrate SUB1 that is located in an upper layer than the optical sensor OS before it is incident on the optical sensor OS.

The optical sensor OS outputs a detection signal in response to the incident light. As described below, the display panel PNL comprises a plurality of optical sensors OS, and based on the detection signals output by these optical sensors OS, it is possible to detect irregularities of the finger Fg, or fingerprint.

In order to obtain a more accurate detection signal, the optical sensor OS preferably receives incident light parallel to the normal direction of the upper surface USF. The collimating layer CL functions as a collimator to parallelize the light incident on the optical sensor OS. That is, the collimating layer CL blocks light inclined with respect to the normal direction of the upper surface USF (in other words, light inclined with respect to the normal direction of the upper surface of the optical sensor OS).

As described above, by mounting the optical sensor OS on the display device DSP, a function as a fingerprint sensor can be added to the display device DSP. The optical sensor OS can also be used to detect information related to a living body in addition to or instead of fingerprint detection. The information related to the living body is, for example, the image of blood vessels such as veins, pulse, pulse wave, etc., and is detected based on the light reflected inside the finger Fg.

Figure 2:
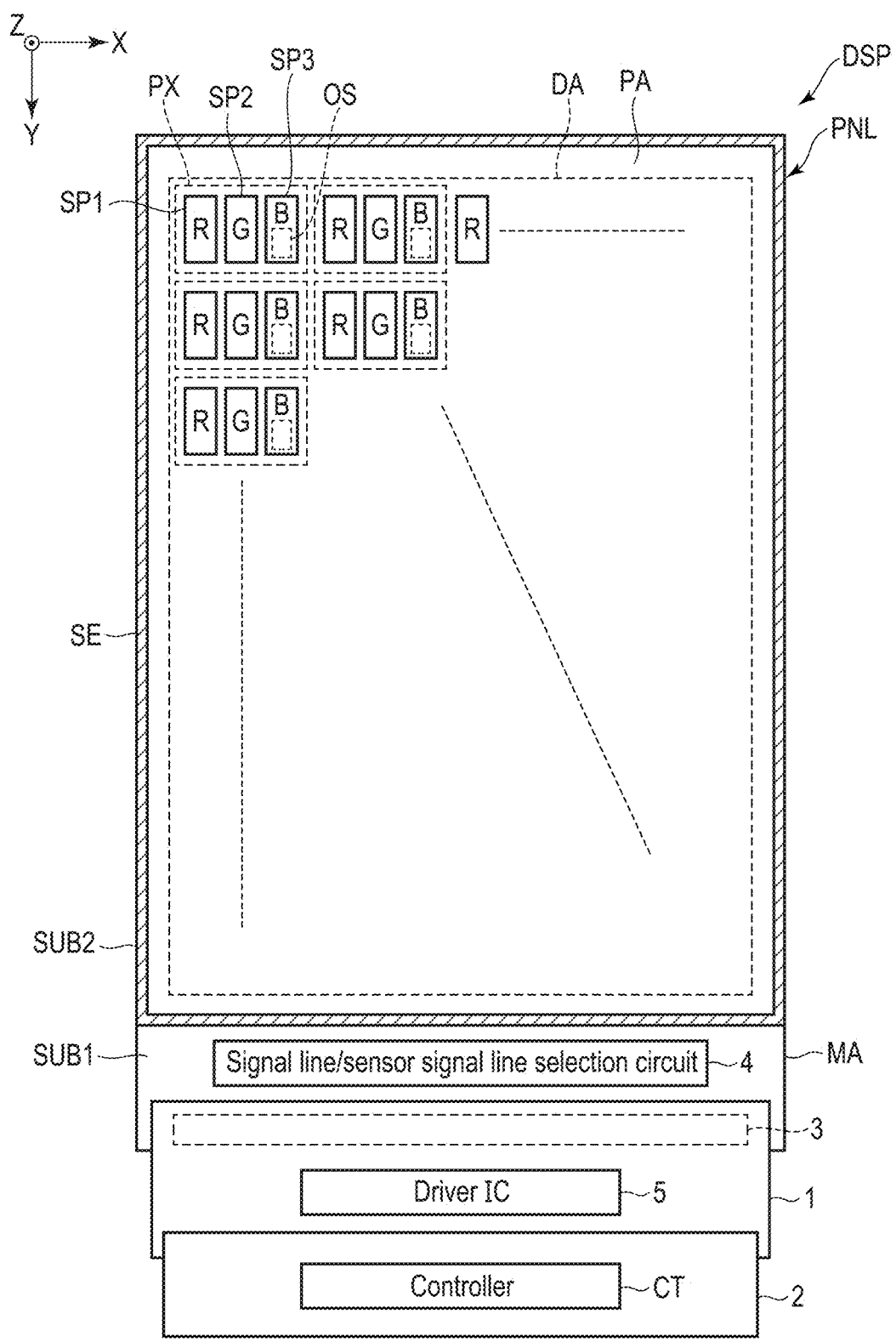
FIG. 2 is a plan view schematically showing the display device according to the embodiment.

FIG. 2 is a plan view schematically showing the display device DSP according to the present embodiment. The display device DSP comprises the display panel PNL described above, a first flexible printed circuit board 1, and a second flexible printed circuit board 2. The display panel PNL has a display area DA for displaying images and a peripheral area PA surrounding the display area DA.

The first substrate SUB1 has a mounting area MA that does not overlap with the second substrate SUB2. The mounting area MA is provided with a terminal 3 for mounting the first flexible printed circuit board 1 and a signal line/sensor signal line selection circuit 4. The sealing material SE is located in the peripheral area PA. In FIG. 2, an area where the sealing material SE is located is indicated by a shaded line. The display area DA is located on an inner side of the sealing material SE. The display panel PNL comprises a plurality of pixels PX arranged in a matrix in the first direction X and the second direction Y in the display area DA.

The pixels PX include a sub-pixel SP1 emitting red (R) light, a sub-pixel SP2 emitting green (G) light, and a sub-pixel SP3 emitting blue (B) light. Note that the pixels PX may include sub-pixels emitting light other than red, green, and blue.

In the example of FIG. 2, one optical sensor OS is arranged for each pixel PX. More precisely, one optical sensor OS is arranged for each sub-pixel SP3 emitting blue light included in each pixel PX. In the entire display area DA, the plurality of optical sensors OS are arranged in a matrix in the first direction X and the second direction Y.

The optical sensors OS need not necessarily be arranged for all pixels PX. For example, the optical sensor OS may be arranged at a ratio of one per multiple pixels PX. The optical sensor OS may also be arranged for pixels PX in some areas of the display area DA and may not be arranged for pixels PX in other areas.

The first flexible printed circuit board 1 is connected to the terminal 3 provided in the mounting area MA. The first flexible printed circuit board 1 is provided with one driver IC 5. The driver IC 5 is arranged so that the center of the driver IC 5 is aligned with the center of the display panel PNL. The driver IC 5 includes a function corresponding to a display mode for displaying images, a function corresponding to a touch sensing mode for detecting an approach or contact of an object, and a function corresponding to a detection operation by the optical sensor OS (a function corresponding to a detection mode for detecting biometric information). The driver IC 5 is mounted on the first flexible printed circuit board 1 by COF (Chip On Film) using ACF, for example.

A controller CT is provided on the second flexible printed circuit board 2. Detection signals output by the optical sensors OS are output to the controller CT via the signal line/sensor signal line selection circuit 4 and the driver IC 5. The controller CT executes arithmetic processing, etc., to detect fingerprints based on the detection signals from the plurality of optical sensors OS. Note that the arithmetic processing, etc., for detecting fingerprints may be executed by the driver IC 5.

FIG. 3 is a plan view of showing a configuration example of a touch sensor TS. Here, a self-capacitance type touch sensor TS is described, but the touch sensor TS may be a mutual capacitance type. The touch sensor TS comprises a plurality of sensor electrodes Rx and a plurality of touch detection lines TL. The plurality of sensor electrodes Rx are located in the display area DA and arranged in a matrix in the first direction X and second direction Y. One sensor electrode Rx overlaps in planar view with the plurality of pixels PX shown in FIG. 2 and configures one sensor block B. The sensor block B is the smallest unit capable of touch sensing. A plurality of touch detection lines TL extend along the second direction Y and line up in the first direction X, respectively, in the display area DA. Each of the touch detection lines TL is arranged at a location overlapping a signal line SL, which is described below. Each of the touch detection lines TL is electrically connected to the corresponding sensor electrode Rx. Each of the touch detection lines TL is drawn out to the peripheral area PA and electrically connected to the driver IC 5 via the first flexible printed circuit board 1.

In the touch sensing mode, a touch drive voltage is applied to the sensor electrode Rx, and sensing is performed at the sensor electrode Rx. A sensor signal corresponding to the sensing result at the sensor electrode Rx is output to the driver IC 5 via the touch detection line TL. Based on the sensor signal, the driver IC 5 or the controller CT detects whether or not an object is approaching or contacting, and the position coordinates of the approaching or contacting object.

In the display mode, a common voltage (Vcom) is applied to the sensor electrode Rx, and the sensor electrode Rx functions as a common electrode CE described below. The common voltage is supplied, for example, via a power feeding line PL described below.

FIG. 4 is an equivalent circuit diagram showing the optical sensor OS and a sensor circuit connected to the optical sensor OS according to the present embodiment.

As shown in FIG. 4, the sensor circuit includes a scanning line for a first sensor SGL1, a scanning line for a second sensor SGL2, a power feeding line for the first sensor SPL1, a power feeding line for the second sensor SPL2, a power feeding line for a third sensor SPL3, a sensor signal line SSL, a switching element SW2A, a switching element SW2B, a switching element SW2C, a capacitor C1, and a capacitor C2.

Note that, hereinafter, the first scanning line for the first sensor SGL1 is referred to as a first scanning line SGL1, the second scanning line for the second sensor SGL2 is referred to as a second scanning line SGL2, the power feeding line for the first sensor SPL1 is referred to as a first power feeding line SPL1, the power feeding line for the second sensor SPL2 is referred to as a second power feeding line SPL2, and the power feeding line for the third sensor SPL3 is referred to as a third power feeding line SPL3.

In FIG. 4, a case in which the switching elements SW2A, SW2B, and SW2C are each configured by an n-type thin film transistor (TFT) is shown; however, the switching elements SW2A, SW2B, and SW2C may be configured by a p-type TFT.

For the optical sensor OS, one electrode is connected to the second power feeding line SPL2, and the other electrode is connected to a node N1. The node N1 is connected to a drain electrode of the switching element SW2A and a gate electrode of the switching element SW2B. One electrode of the optical sensor OS is supplied with a second voltage Vcom_FPS through the second power feeding line SPL2. The second voltage Vcom_FPS may be referred to as a reference voltage for the sensor. In a case where light is incident on the optical sensor OS, a signal (electric charge) corresponding to the incident light intensity is output from the optical sensor OS and stored in the capacitor C1. Note that the capacitance held in the capacitor C2 is a parasitic capacitance added to the capacitance held in the capacitor C1.

For the switching element SW2A, a gate electrode is connected to the first scanning line SGL1, a source electrode is connected to the first power feeding line SPL1, and the drain electrode is connected to the node N1. When the switching element SW2A is turned on in response to a scanning signal supplied from the first scanning line SGL1, the potential of the node N1 (i.e., the potential of the other electrode of the optical sensor OS) is reset to a first potential VPP1 by a first voltage VPP1 supplied through the first power feeding line SPL1. The first voltage VPP1 may be referred to as a reset voltage. The switching element SW2A may be referred to as a reset transistor. The second voltage Vcom_FPS is lower than the first voltage VPP1, and the optical sensor OS is driven reverse biased.

For switching element SW2B, the gate electrode is connected to the node N1, a source electrode is connected to the third power feeding line SPL3 supplying a third voltage VPP2, and a drain electrode is connected to a source electrode of switching element SW2C. The gate electrode of switching element SW2B is supplied with the signal output from the optical sensor OS. The switching element SW2B outputs a voltage signal corresponding to the signal output from the optical sensor OS (voltage signal obtained by amplifying the signal output from the optical sensor OS) to the switching element SW2C. The switching element SW2B may be referred to as a source follower transistor.

For the switching element SW2C, a gate electrode is connected to the second scanning line SGL2, the source electrode is connected to the drain electrode of the switching element SW2B, and a drain electrode is connected to the sensor signal line SSL. When the switching element SW2C is turned on in response to a scanning signal supplied from the second scanning line SGL2, the voltage signal output from the switching element SW2B is output to the sensor signal line SSL as a detection signal Vdet. The switching element SW2C may be referred to as a reed transistor.

In FIG. 4, a case where the switching elements SW2A and SW2C have a double-gate structure is shown; however, the switching elements SW2A and SW2C may have a single-gate structure or a multi-gate structure.

FIG. 5 illustrates an operation example of the optical sensor OS and the sensor circuit connected to the optical sensor OS according to the present embodiment. The optical sensor OS performs fingerprint imaging (detection operation) in a fingerprint imaging period P1 shown in FIG. 5. As shown in FIG. 5, the fingerprint imaging period P1 includes a reset period P11, an exposure period P12, and a read period P13. Note that, although it is not shown here, one electrode of the optical sensor OS is supplied with the second voltage Vcom_FPS over the reset period P11, the exposure period P12, and the read period P13.

The reset period P11 is a period during which the potential of the node N1 is reset. When the reset period P11 starts at time t0, and the switching element SW2A is turned on in response to the scanning signal supplied from the first scanning line SGL1, the potential of the node N1 is reset to VPP1 by the first voltage VPP1 supplied through the first power feeding line SPL1. At time t1, when the switching element SW2C is turned on in response to the scanning signal supplied from the second scanning line SGL2, a detection signal Vdet1 is output to the sensor signal line SSL. The potential of the detection signal Vdet1 becomes VPP1-Vth-Vsw2c. Note that Vth is a threshold voltage of the switching element SW2B, which is a source follower transistor, and Vsw2c is a voltage drop caused by the on-resistance of the switching element SW2C.

At time t2, when the reset period P11 ends and the exposure period P12 starts, the switching element SW2A is turned off. When the exposure period P12 starts, the potential of the node N1 gradually decreases according to the amount of light incident on the optical sensor OS (light reflected by the finger) and becomes VPP1-ΔVos. Note that ΔVos is a voltage drop generated by the light incident on the optical sensor OS. At time t3 during the exposure period P12, the switching element SW2C is turned off.

At time t4, when the exposure period P12 ends and the read period P13 starts, the switching element SW2C is turned on in response to the scanning signal supplied from the second scanning line SGL2, and a detection signal Vdet2 is output to the sensor signal line SSL. The potential of the detection signal Vdet2 becomes VPP1-Vth-Vsw2c-ΔVos. That is, the potential of the detection signal Vdet2 is lower than that of the detection signal Vdet1 described above by ΔVos. At time t5, the read period P13 ends.

The controller CT (or the driver IC 5) compares the potential of the detection signal Vdet1 with the potential of the detection signal Vdet2, and, based on the difference (i.e., ΔVos), light incident on the optical sensor OS can be detected. Note that, although FIG. 5 shows an operation example of one optical sensor OS and one sensor circuit, all optical sensors OS and all sensor circuits can be operated in the same manner. The controller CT (or the driver IC 5) can detect finger irregularities (fingerprints), blood vessel images (vein patterns), etc., by analyzing the in-plane distribution of the above-described differences obtained from all optical sensor OSs.

Figure 6:
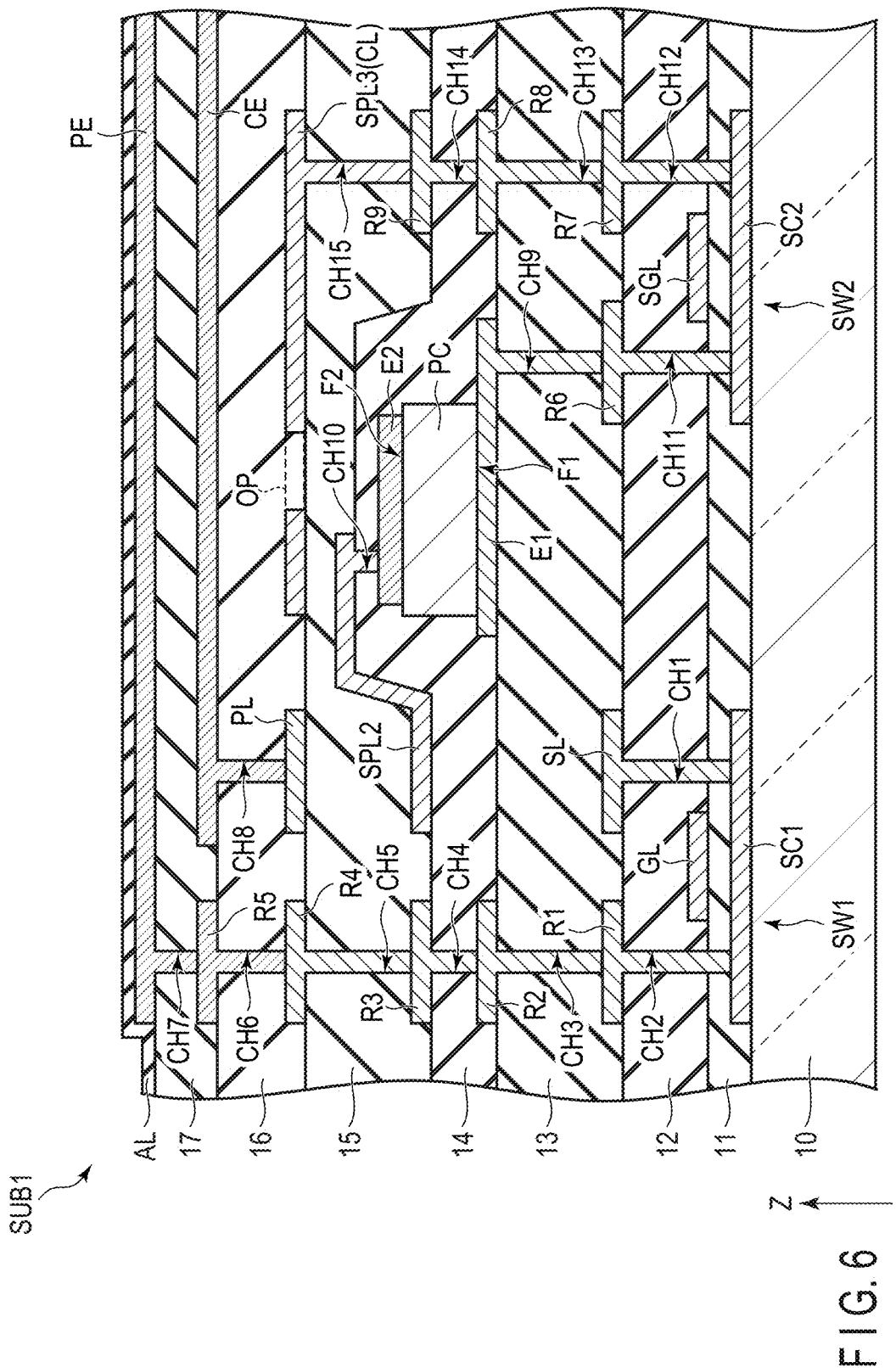
FIG. 6 is a schematic cross-sectional view showing an example of a structure that can be applied to a first substrate according to the embodiment.

FIG. 6 is a cross-sectional view showing a schematic configuration example of the first substrate SUB1. The first substrate SUB1 comprises a transparent first substrate 10, insulating layers 11, 12, 13, 14, 15, 16, and 17, and an alignment film AL.

The first substrate 10 is, for example, a glass substrate or a resin substrate. The insulating layers 11, 12, 14, and 17 are formed of inorganic materials. The insulating layers 13, 15, and 16 are formed of organic materials. The insulating layers 11, 12, 13, 14, 15, 16, and 17 and the alignment film AL are stacked in this order in the third direction Z above the first substrate 10.

The first substrate SUB1 comprises a signal line SL, a scanning line GL, a switching element SW1, a pixel electrode PE, a common electrode CE, relay electrodes R1, R2, R3, R4, and R5, and a power feeding line PL as elements related to image display. The pixel electrode PE and the switching element SW1 are provided for each of the sub-pixels SP1, SP2, and SP3. The common electrode CE is provided over a plurality of pixels PX, for example.

The switching element SW1 includes a semiconductor layer SC1. The semiconductor layer SC1 is arranged between the first base material 10 and the insulating layer 11. The scanning line GL is arranged between the insulating layers 11 and 12 and faces the semiconductor layer SC1. Note that the scanning line GL may be arranged in another layer instead of between the insulating layers 11 and 12. The signal line SL is arranged between the insulating layers 12 and 13 and is in contact with the semiconductor layer SC1 through a contact hole CH1 that penetrates the insulating layers 11 and 12.

The relay electrode R1 is arranged between the insulating layers 12 and 13, that is, on the same layer as the signal line SL, and is in contact with the semiconductor layer SC1 through a contact hole CH2 that penetrates the insulating layers 11 and 12. The relay electrode R2 is arranged between the insulating layers 13 and 14 and is in contact with the relay electrode R1 through a contact hole CH3 that penetrates the insulating layer 13. The relay electrode R3 is arranged between the insulating layers 14 and 15 and contacts the relay electrode R2 through a contact hole CH4 that penetrates the insulating layer 14. The relay electrode R4 is arranged between the insulating layers 15 and 16 and contacts the relay electrode R3 through a contact hole CH5 that penetrates the insulating layer 15. The relay electrode R5 is arranged between the insulating layers 16 and 17 and is in contact with the relay electrode R4 through a contact hole CH6 that penetrates the insulating layer 16.

The pixel electrode PE is arranged between the insulating layer 17 and the alignment film AL, and is in contact with the relay electrode R5 through a contact hole CH7 that penetrates the insulating layer 17. The power feeding line PL is arranged between the insulating layers 15 and 16, that is, on the same layer as the relay electrode R4. The common electrode CE is arranged between the insulating layers 16 and 17, that is, on the same layer as the relay electrode R5, and is in contact with the power feeding line PL through a contact hole CH8 that penetrates the insulating layer 16.

A common voltage Vcom is supplied to the power feeding line PL. The common voltage Vcom is supplied to the common electrode CE. A video signal is supplied to the signal line SL and a scanning signal is supplied to the scanning line GL. When the scanning signal is supplied to the scanning line GL, the video signal of the signal line SL is supplied to the pixel electrode PE through the semiconductor layer SC1 and the relay electrodes R1, R2, R3, R4, and R5. At this time, an electric field is generated between the pixel electrode PE and the common electrode CE due to a potential difference between the potential of the pixel electrode PE and the potential Vcom of the common electrode CE according to the video signal, and this electric field acts on the liquid crystal layer LC.

The first substrate SUB1 comprises a switching element SW2, a sensor scanning line SGL, relay electrodes R6, R7, R8, and R9, a second power feeding line SPL2, and a third power feeding line SPL3 (collimating layer CL) as elements related to the optical sensor OS. The optical sensor OS comprises a first electrode E1 (lower electrode), a second electrode E2 (upper electrode), and a photoelectric conversion element PC.

Note that, in FIG. 6, for convenience of explanation, elements related to the multiple switching elements SW2A, SW2B, and SW2C involved in the optical sensor OS are represented as the switching element SW2. In addition, in FIG. 6, an element that functions as a gate electrode of the switching element SW2 is represented as the sensor scanning line SGL. In FIG. 6, an element that functions as a source electrode of the switching element SW2 is represented as the relay electrode R7. In FIG. 6, an element that functions as a drain electrode of the switching element SW2 is represented as the relay electrode R6. Furthermore, in FIG. 6, not all of the elements involved in the optical sensor OS, but some of them are illustrated.

The photoelectric conversion element PC has a first surface F1 facing the first substrate 10 and a second surface F2 facing the liquid crystal layer LC. The second surface F2 of the photoelectric conversion element PC corresponds to the upper surface of the optical sensor OS. The photoelectric conversion element PC is located between the insulating layers 13 and 14. The first electrode E1 is arranged between the photoelectric conversion element PC and the insulating layer 13 and is in contact with the first surface F1. The outer periphery of the first electrode E1 protrudes from the photoelectric conversion element PC and is covered by the insulating layer 14. The first electrode E1 is in contact with the relay electrode R6 through a contact hole CH9 that penetrates the insulating layer 13 below the photoelectric conversion element PC. The second electrode E2 is arranged between the photoelectric conversion element PC and the insulating layer 14 and is in contact with the second surface F2. The second electrode E2 is in contact with the second power feeding line SPL2 through a contact hole CH10 that penetrates the insulating layer 14 above the photoelectric conversion element PC.

The second power feeding line SPL2 is arranged between the insulating layers 14 and 15 and is in contact with the second electrode E2 through the contact hole CH10 penetrating the insulating layer 14. A second voltage Vcom_FPS is supplied to the second power feeding line SPL2, and the second voltage Vcom_FPS is supplied to the second electrode E2 through the second power feeding line SPL2.

The switching element SW2 includes a semiconductor layer SC2. The semiconductor layer SC2 is arranged between the first base material 10 and the insulating layer 11. The sensor scanning line SGL is arranged between the insulating layers 11 and 12 and faces the semiconductor layer SC2. Note that the sensor scanning line SGL may be arranged in another layer instead of between the insulating layers 11 and 12.

The relay electrode R6 is arranged between the insulating layers 12 and 13 and is in contact with semiconductor layer SC2 through a contact hole CH11 that penetrates the insulating layers 11 and 12. The relay electrode R7 is arranged between the insulating layers 12 and 13, that is, on the same layer as the relay electrode R6, and is in contact with semiconductor layer SC2 through a contact hole CH12 that penetrates the insulating layers 11 and 12. The relay electrode R8 is arranged between the insulating layers 13 and 14, that is, on the same layer as the first electrode E1, and is in contact with the relay electrode R7 through a contact hole CH13 that penetrates the insulating layer 13. The relay electrode R9 is arranged between the insulation layers 14 and 15, that is, on the same layer as the second power feeding line SPL2, and is in contact with the relay electrode R8 through a contact hole CH14 that penetrates the insulation layer 14.

The third power feeding line SPL3 is arranged between the insulating layers 15 and 16, that is, on the same layer as the power feeding line PL, and is in contact with the relay electrode R9 through a contact hole CH15 that penetrates the insulating layer 15. The third voltage VPP2 is supplied to the third power feeding line SPL3. In addition to supplying the third voltage VPP2, the third power feeding line SPL3 also functions as a collimating layer CL. In other words, a part of the third power feeding line SPL3 is the collimating layer CL, and the third power feeding line SPL3 has an opening OP at a location overlapping the second surface F2 of the photoelectric conversion element PC.

The signal line SL and the relay electrodes R1, R6, and R7 are formed of the same metallic material. The first electrode E1 and the relay electrodes R2 and R8 are formed of the same metallic material. The second power feeding line SPL2 and the relay electrodes R3 and R9 are formed of the same metallic material. The power feeding line PL, the third power feeding line SPL3 (collimating layer CL), and the relay electrode R4 are formed of the same metallic material. The second electrode E2, the pixel electrode PE, the common electrode CE, and the relay electrode R5 are formed of a transparent conductive material such as indium tin oxide (ITO).

The first electrode E1 formed of a metallic material also functions as a light-shielding layer, suppressing the light incident from below onto the photoelectric conversion element PC. The photoelectric conversion element PC is, for example, a photodiode, which outputs a detection signal Vdet in response to the incident light. A positive intrinsic negative (PIN) photodiode can be used as the photoelectric conversion element PC. This type of photodiode has a p-type semiconductor layer, an i-type semiconductor layer, and an n-type semiconductor layer. The p-type semiconductor layer is located on the second electrode E2 side, the n-type semiconductor layer is located on the first electrode E1 side, and the i-type semiconductor layer is located between the p-type and n-type semiconductor layers.

The p-type, i-type, and n-type semiconductor layers are formed, for example, by amorphous silicon (a-Si). Note that the materials of the semiconductor layers are not limited thereto, and amorphous silicon may be replaced by polycrystalline silicon, microcrystalline silicon, or the like, and the polycrystalline silicon may be replaced by amorphous silicon, microcrystalline silicon, or the like.

In addition, an organic photo diode (OPD) may be used instead of a PIN photodiode.

A scanning signal is supplied to the sensor scanning line SGL at the timing when detection should be performed by the sensor OS. When the scanning signal is supplied to the sensor scanning line SGL, the detection signal Vdet generated by the photoelectric conversion element PC is output to the sensor signal line SSL, which is omitted in FIG. 6. The detection signal Vdet output on the sensor signal line SSL is output to the driver IC 5.

Figure 7:
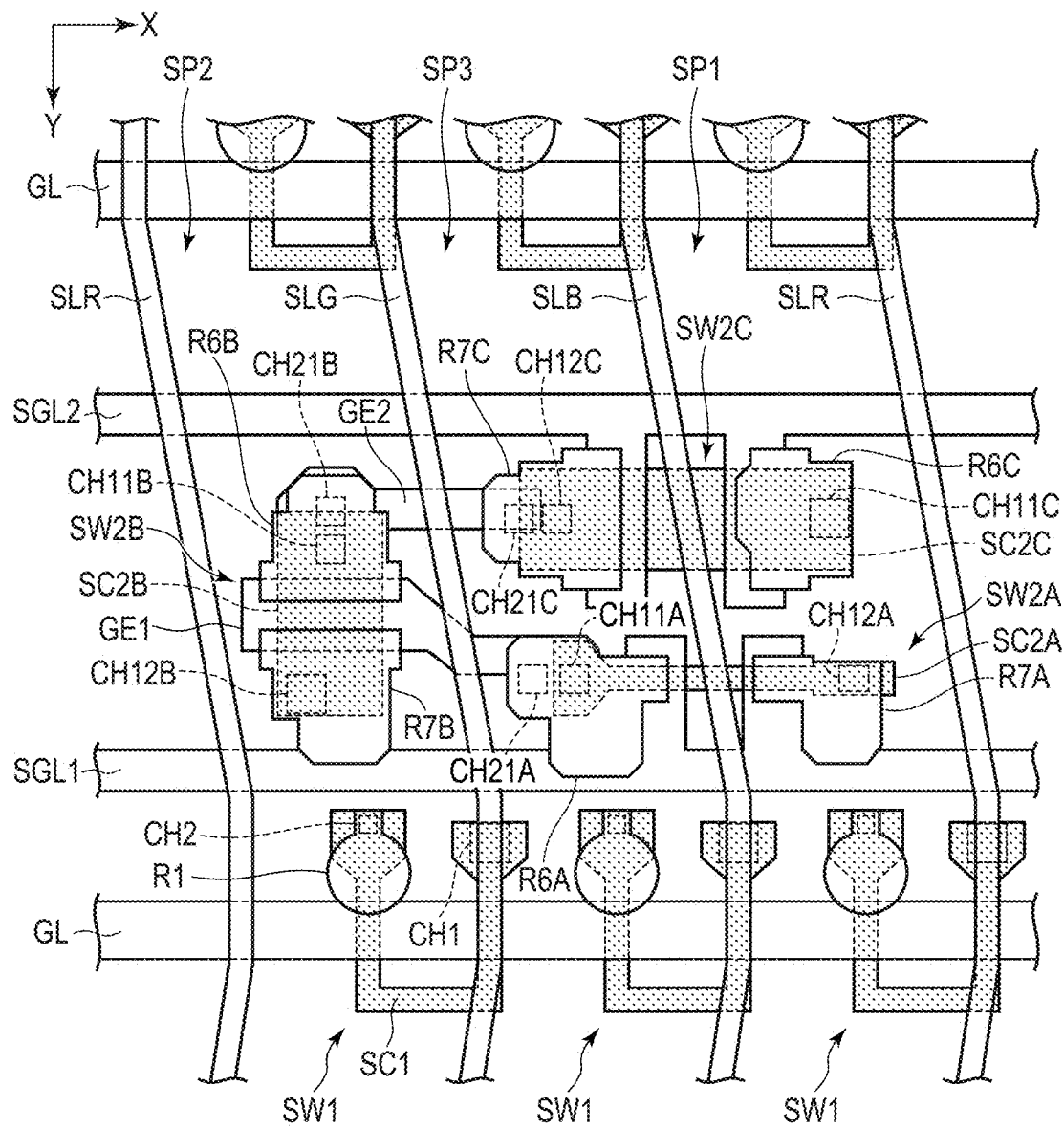
FIG. 7 is a schematic plan view showing an example of a structure that can be applied to the first substrate according to the embodiment.

FIG. 7 is a plan view schematically showing elements that can be applied to the first substrate SUB1 and that are arranged between the first substrate 10 and the insulating layer 13 shown in FIG. 6. Note that, in FIG. 7, "A" is denoted at the end of symbols of elements related to a switching element SW2A, "B" is denoted at the end of symbols of elements related to a switching element SW2B, and "C" is denoted at the end of symbols of elements related to a switching element SW2C.

The scanning lines GL, the first scanning line SGL1, and the second scanning line SGL2 extend along the first direction X and are aligned along the second direction Y, respectively. The first scanning line SGL1 and the second scanning line SGL2 are aligned adjacent to each other in the second direction Y. The first scanning line SGL1 and the second scanning line SGL2 are arranged between two adjacent scanning lines GL.

A signal line SLR corresponding to the red sub-pixel SP1, a signal line SLG corresponding to the green sub-pixel SP2, and a signal line SLB corresponding to the blue sub-pixel SP3 extend along the second direction Y while bending, and are aligned along the first direction X.

The sub-pixels SP1, SP2, and SP3 are arranged in an area surrounded by the two scanning lines GL, which are adjacently aligned along the second direction Y, and two signal lines SL, which are adjacently aligned along the first direction X. The sub-pixels SP1, SP2, and SP3 each have an opening surrounded by the second scanning line SGL2 and the first scanning line SGL1 and the two adjacent signal lines SL.

The first scanning line SGL1 has a branch portion (convex portion) extending along the second direction Y. This branch portion serves as a gate electrode of the switching element SW2A. A semiconductor layer SC2A is arranged in an area superimposed on the gate electrode of the switching element SW2A in planar view.

The semiconductor layer SC2A is arranged across the opening of the sub-pixel SP3 and the opening of the sub-pixel SP1, and a part thereof overlaps the signal line SLB corresponding to the sub-pixel SP3. In the opening of the sub-pixel SP1, an island-shaped relay electrode R7A, which functions as a source electrode of the switching element SW2A, is arranged overlapping the semiconductor layer SC2A. The relay electrode R7A is in contact with the semiconductor layer SC2A through a contact hole CH12A. In the opening of the sub-pixel SP3, an island-shaped relay electrode R6A, which functions as the drain electrode of the switching element SW2A, is arranged overlapping the semiconductor layer SC2A. The relay electrode R6A is in contact with the semiconductor layer SC2A through a contact hole CH11A.

The relay electrode R6A is in contact with a first gate electrode GE1 that functions as the gate electrode of the switching element SW2B through a contact hole CH21A. The contact hole CH21 is a through hole penetrating the insulating layer 12 and brings an element located on the same layer as the relay electrodes R6 and R7 in contact with an element located on the same layer as the first scanning line SGL1 and the second scanning line SGL2.

The first gate electrode GE1 is arranged across the opening of the sub-pixel SP3 and the opening of the sub-pixel SP2, and a part thereof overlaps the signal line SLG corresponding to the sub-pixel SP2. In the opening of the sub-pixel SP2, a semiconductor layer SC2B is arranged in an area superimposed on the first gate electrode GE1 in planar view.

An island-shaped relay electrode R7B, which functions as a source electrode of the switching element SW2B, is arranged at a location overlapping the semiconductor layer SC2B. The relay electrode R7B is in contact with the semiconductor layer SC2B through a contact hole CH12B. An island-shaped relay electrode R6B, which functions as the drain electrode of the switching element SW2B, is arranged at a location overlapping the semiconductor layer SC2B. The relay electrode R6B is in contact with the semiconductor layer SC2B through a contact hole CH11B.

The relay electrode R6B is in contact with a second gate electrode GE2 through a contact hole CH21B. The second gate electrode GE2 is arranged across the opening of the sub-pixel SP2 and the opening of the sub-pixel SP3, and a part thereof overlaps the signal line SLG corresponding to the sub-pixel SP2. The switching element SW2B and the switching element SW2C are connected by the second gate electrode GE2.

The second scanning line SGL2 has a branch portion (convex portion) extending along the second direction Y. This branch portion serves as a gate electrode of the switching element SW2C. A semiconductor layer SC2C is arranged in an area superimposed on the gate electrode of the switching element SW2C in planar view.

The semiconductor layer SC2C is arranged across the opening of the sub-pixel SP3 and the opening of the sub-pixel SP1, and a part thereof overlaps the signal line SLB corresponding to the sub-pixel SP3. In the opening of the sub-pixel SP3, an island-shaped relay electrode R7C, which functions as the source electrode of the switching element SW2C, is arranged overlapping the semiconductor layer SC2C. The relay electrode R7C is in contact with the semiconductor layer SC2C through a contact hole CH12C. The relay electrode R7C is also in contact with the second gate electrode GE2 through a contact hole CH21C.

In the opening of the sub-pixel SP1, an island-shaped relay electrode R6C, which functions as a drain electrode of the switching element SW2C, is arranged overlapping the semiconductor layer SC2C. The relay electrode R6C is in contact with the semiconductor layer SC2C through a contact hole CH11C.

Note that, in the opening between the first scanning line SGL1 and the scanning line GL, the switching element SW1 is arranged as an element related to image display. The semiconductor layer SC1 included in the switching element SW1 is in contact with the corresponding color signal line SL through the contact hole CH1. The semiconductor layer SC1 included in the switching element SW1 is in contact with the relay electrode R1 through the contact hole CH2.

Figure 8:
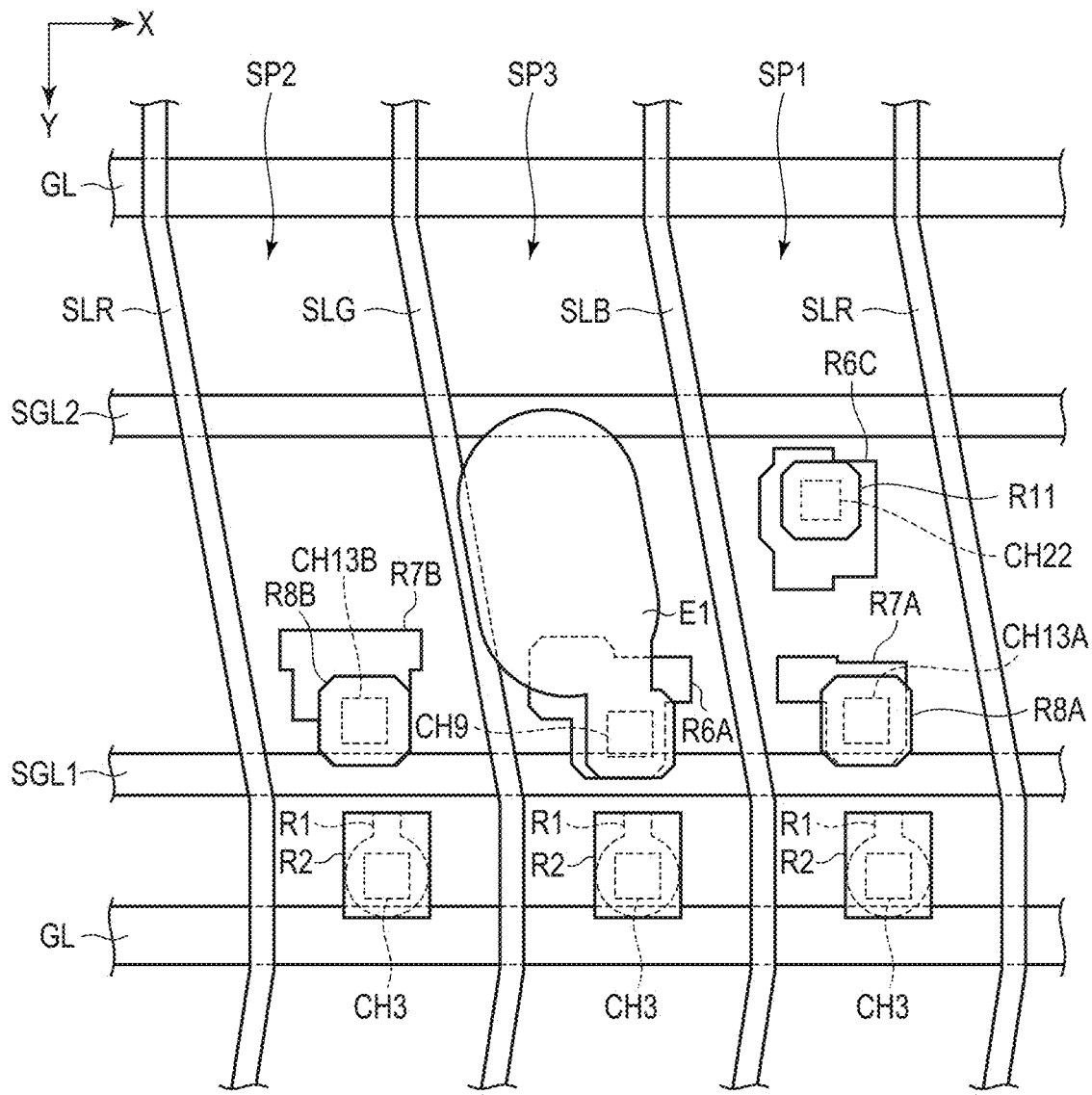
FIG. 8 is a schematic plan view showing an example of a structure that can be applied to the first substrate according to the embodiment.

FIG. 8 is a plan view schematically showing elements that can be applied to the first substrate SUB1 and that are arranged between the insulating layers 13 and 14 shown in FIG. 6. In FIG. 8, the scanning lines GL, the signal lines SL (SLR, SLG, SLB), the first scanning line SGL1 and the second scanning line SGL2 shown in FIG. 7 are also partially simplified in order to make the positional relationship easier to understand.

An island-shaped relay electrode R8A is arranged in the opening of the sub-pixel SP1. The relay electrode R8A is in contact with the relay electrode R7A on the lower layer through a contact hole CH13A.

In addition, an island-shaped relay electrode R11 is arranged in the opening of the sub-pixel SP1. The relay electrode R11 is arranged between the insulating layers 13 and 14, that is, on the same layer as the relay electrode R8 and the first electrode E1, and is in contact with the relay electrode R6C on the lower layer through a contact hole CH22. The contact hole CH22 is a through hole penetrating the insulating layer 13 and brings the relay electrode R11 in contact with the relay electrode R6C.

An island-shaped relay electrode R8B is arranged in the opening of the sub-pixel SP2. The relay electrode R8B is in contact with the relay electrode R7B on the lower layer through a contact hole CH13B.

The first electrode E1 of the optical sensor OS is arranged in the opening of the sub-pixel SP3. The first electrode E1 is in contact with the layer relay electrode R6A on the lower layer through a contact hole CH9.

Note that, in the opening between the first scanning line SGL1 and the scanning line GL, an island-shaped relay electrode R2 corresponding to each of the signal lines SLR, SLG, and SLB is arranged as an element related to image display. The relay electrode R2 is in contact with the relay electrode R1 on the lower layer through the contact hole CH3.

Figure 9:
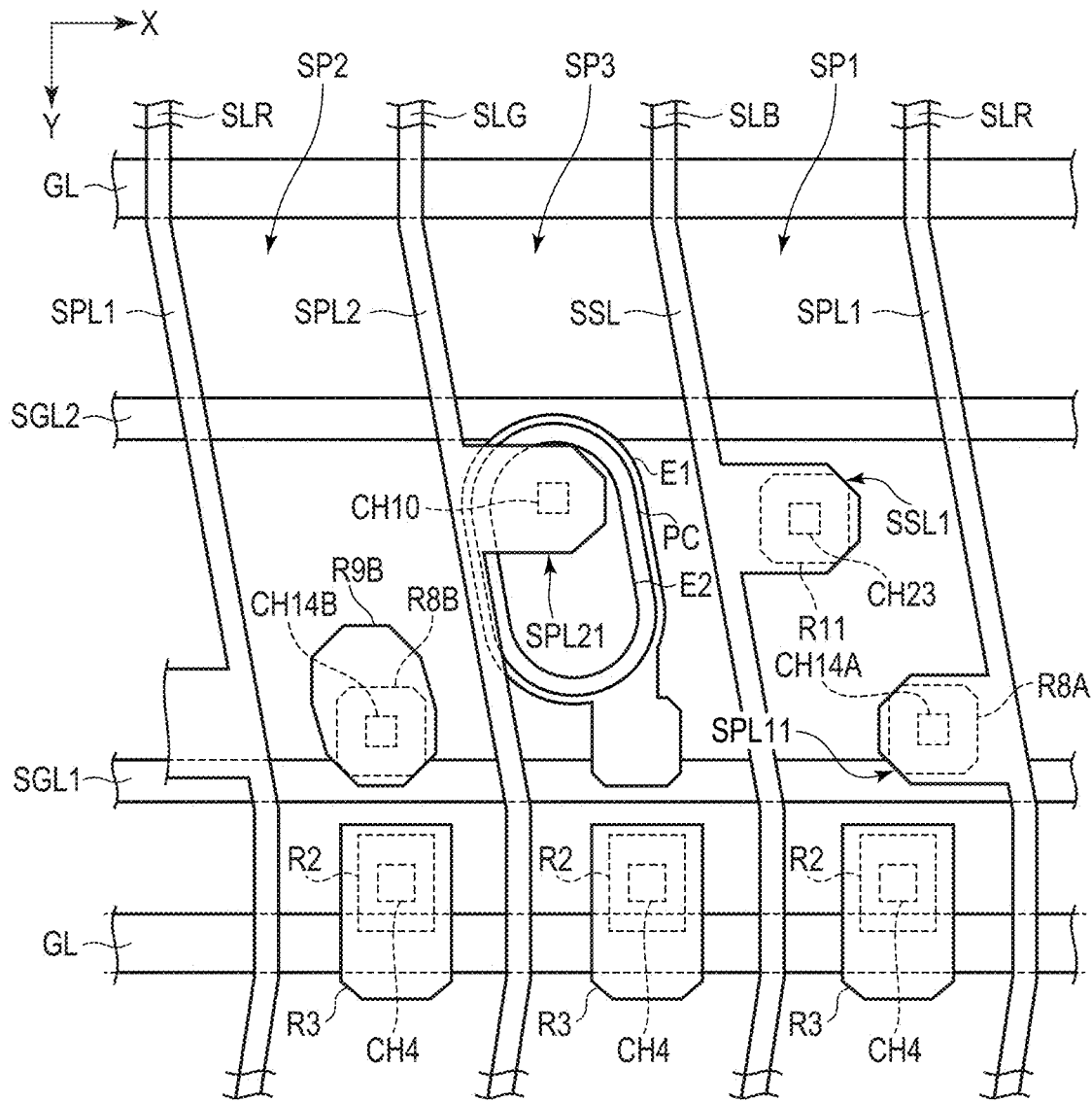
FIG. 9 is a schematic plan view showing an example of a structure that can be applied to the first substrate according to the embodiment.

FIG. 9 is a plan view schematically showing elements that can be applied to the first substrate SUB1 and that are arranged between the insulating layers 14, 15 shown in FIG. 6. In FIG. 9, the scanning lines GL, the first scanning line SGL1, and the second scanning line SGL2 shown in FIG. 7 are partially simplified in order to make the positional relationship easier to understand.

The first power feeding line SPL1, the second power feeding line SPL2, and the sensor signal line SSL extend along the second direction Y while bending and are aligned along the first direction X. The first power feeding line SPL1 overlaps in planar view with the signal line SLR corresponding to the red sub-pixel SP1. The second power feeding line SPL2 overlaps in planar view with the signal line SLG corresponding to the green sub-pixel SP2. The sensor signal line SSL overlaps in planar view with the signal line SLB corresponding to the blue sub-pixel SP3.

The sensor signal line SSL has a branch portion (convex portion) SSL1 extending along the first direction X toward the opening of the sub-pixel SP1, and, at this branch portion SSL1, is in contact with the relay electrode R11 on the lower layer through a contact hole CH23. The contact hole CH23 is a through hole penetrating the insulating layer 14 and brings the branch portion SSL1 in contact with the relay electrode R11. As a result, the sensor signal line SSL and the switching element SW2C are electrically connected, and the detection signal Vdet can be output to the sensor signal line SSL.

The first power feeding line SPL1 has a branch portion (convex portion) SPL11 extending along the first direction X toward the opening of the sub-pixel SP1, and, at this branch portion SPL11, is in contact with the relay electrode R8A on the lower layer through a contact hole CH14A. As a result, the first power feeding line SPL1 and the switching element SW2A are electrically connected, and the first voltage VPP1 can be supplied to the switching element SW2A.

An island-shaped relay electrode R9B is arranged in the opening of the sub-pixel SP2. The relay electrode R9B is arranged between the insulating layers 14 and 15, that is, on the same layer as the first power feeding line SPL1, the second power feeding line SPL2, and the sensor signal line SSL, and is in contact with the relay electrode R8B on the lower layer through a contact hole CH14B.

The photoelectric conversion element PC is arranged on the first electrode E1, which is arranged in the opening of the sub-pixel SP3. The second electrode E2 of the optical sensor OS is arranged on the photoelectric conversion element PC. The optical sensor OS has an oval shape with a major axis extending parallel to the second power feeding line SPL2 and a minor axis orthogonal to the major axis. Therefore, the photoelectric conversion element PC, the first electrode E1, and the second electrode E2 are formed in an oval shape having a major axis extending parallel to the second power feeding line SPL2 and a minor axis orthogonal to the major axis.

The second power feeding line SPL2 has a branch portion (convex portion) SPL21 extending along the first direction X toward the opening of the sub-pixel SP3, and, at this branch portion SPL21, is in contact with the second electrode E2 of the optical sensor OS through the contact hole CH10. As a result, the second power feeding line SPL2 and the optical sensor OS are electrically connected, and the second voltage Vcom_FPS can be supplied to the optical sensor OS.

Note that, in the opening between the first scanning line SGL1 and the scanning line GL, an island-shaped relay electrode R3 corresponding to each of the signal lines SLR, SLG, and SLB is arranged as an element related to image display. The relay electrode R3 is in contact with the relay electrode R2 on the lower layer through the contact hole CH4.

Figure 10:
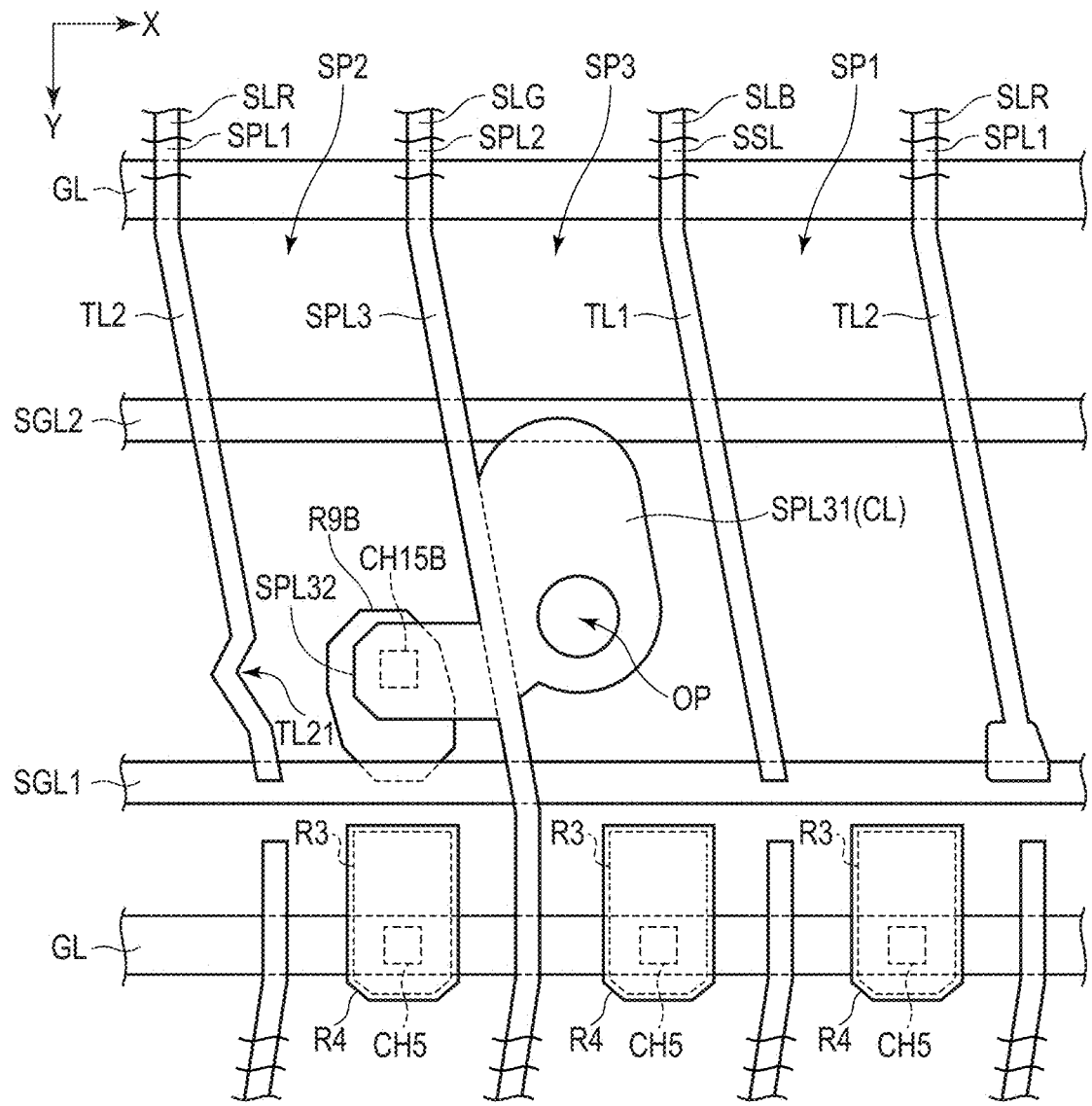
FIG. 10 is a schematic plan view showing an example of a structure that can be applied to the first substrate according to the embodiment.

FIG. 10 is a plan view schematically showing elements that can be applied to the first substrate SUB1 and that are arranged between the insulating layers 15 and 16 shown in FIG. 6. In FIG. 10, the scanning lines GL, the first scanning line SGL1, and the second scanning line SGL2 shown in FIG. 7 are partially simplified in order to make the positional relationship easier to understand.

Touch detection lines TL1 and TL2 and the third power feeding line SPL3 extend along the second direction Y while bending and are aligned along the first direction X. The touch detection line TL1 overlaps in planar view with the signal line SLB corresponding to the blue sub-pixel SP3 and the sensor signal line SSL. The touch detection line TL2 overlaps in planar view with the signal line SLR corresponding to the red sub-pixel SP1 and the first power feeding line SPL1. The third power feeding line SPL3 overlaps in planar view with the signal line SLG corresponding to the green sub-pixel SP2 and the second power feeding line SPL2.

The third power feeding line SPL3 has an oval first branch portion SPL31 that overlaps the outer periphery of the photoelectric conversion element PC at the opening of the sub-pixel SP3. The size of the first branch portion SPL31 is larger than the size of the photoelectric conversion element PC. The first branch portion SPL31 corresponds to the collimating layer CL, which has a circular opening OP. The collimating layer CL (first branch portion SPL31) transmits light from the liquid crystal layer LC side at the opening OP and blocks light from the liquid crystal layer LC side at other portions.

The third power feeding line SPL3 has, in addition to the oval collimating layer CL, a second branch portion (convex portion) SPL32 extending along the first direction X toward the opening of the sub-pixel SP2. At this second branch portion SPL32, the third power feeding line SPL3 is in contact with the relay electrode R9B arranged in the opening of the sub-pixel SP2 through a contact hole CH15B. As a result, the third power feeding line SPL3 and the switching element SW2B are electrically connected, and the third voltage VPP2 can be supplied to the switching element SW2B.

The touch detection lines TL1 and TL2 output sensor signals corresponding to the sensing results at the sensor electrode Rx to the driver IC 5. The touch detection line TL2 has a concave shape on an opposite side of the opening of the sub-pixel SP2 at a location facing the second branch portion SPL32 that branches from the third power feeding line SPL3 to the opening side of the sub-pixel SP2. In other words, the touch detection line TL2 has a concave portion TL21 that is concave at the location facing the second branch portion SPL32 so as to be separated from the second branch portion SPL32. According to this, it is possible to prevent the touch detection line TL2 and the second branch portion SPL32 from coming into contact and short-circuiting.

Note that, in the opening between the first scanning line SGL1 and the scanning line GL, an island-shaped relay electrode R4 corresponding to each of the signal lines SLR, SLG, and SLB is arranged as an element related to image display. The relay electrode R4 is in contact with the relay electrode R3 on the lower layer through the contact hole CH5.

Figure 11:
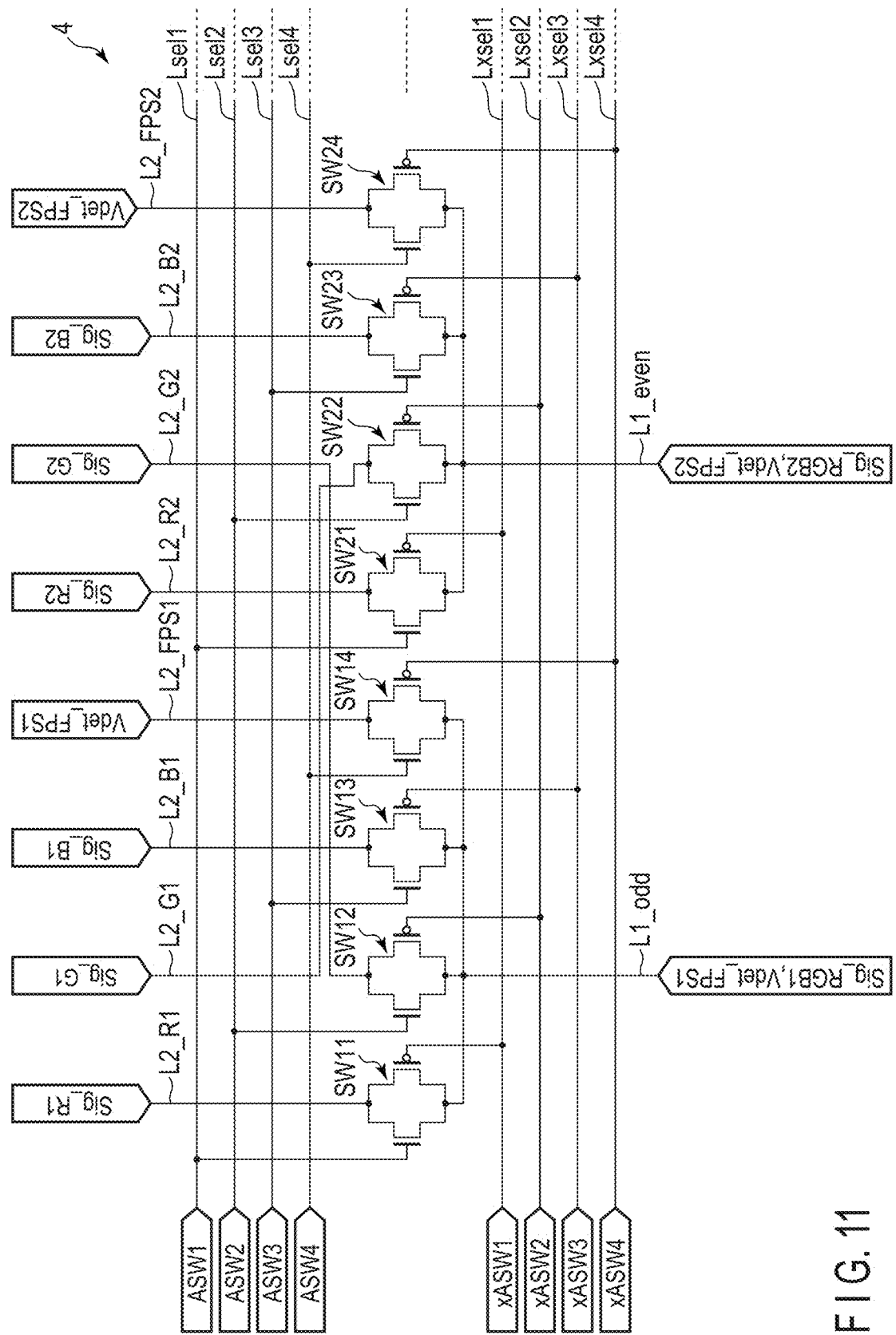
FIG. 11 shows an example of a circuit configuration of a signal line/sensor signal line selection circuit according to the embodiment.

FIG. 11 shows an example of a circuit configuration of the signal line/sensor signal line selection circuit 4.

As shown in FIG. 11, the signal line/sensor signal line selection circuit 4 has four second wiring lines L2_R, L2_G, L2_B, and L2_FPS with respect to one first wiring line L1. The first wiring line L1 is a wiring line provided for each pixel row and is used to transmit a video signal Sig_RGB output from the driver IC 5 in the display mode and the detection signal Vdet to the driver IC 5 during detection operation. The second wiring line L2_R is a wiring line for transmitting a video signal Sig_R to the red sub-pixel SP1 included in each pixel PX located in a given pixel row. The second wiring line L2_G is a wiring line for transmitting a video signal Sig_G to the green sub-pixel SP2 included in each pixel PX located in a given pixel row. The second wiring line L2_B is a wiring line for transmitting a video signal Sig_B to the blue sub-pixel SP3 included in each pixel PX located in a given pixel row. The second wiring line L2_FPS is a wiring line for transmitting the detection signal Vdet output from the optical sensor OS.

In the signal line/sensor signal line selection circuit 4, four switching elements SW are provided with respect to one first wiring line L1. More specifically, four switching elements SW11 to SW14 are provided for one first wiring line L1_odd corresponding to an odd-numbered pixel row, and four switching elements SW21 to SW24 are provided for one first wiring line L1_even corresponding to an even-numbered pixel row. The switching elements SW11 to SW14 and SW21 to SW24 have n-type TFT and p-type TFT, respectively. The n-type TFT is a so-called n-type semiconductor (nMOS), which is turned on by a positive control signal ASW, and is turned on mainly when transmitting a negative signal. The p-type TFT is a so-called p-type semiconductor (pMOS), which is turned on by a negative control signal xASW, and is turned on mainly when transmitting a positive signal. However, both n-type and p-type TFTs may be turned on regardless of the polarity of the transmitted signal.

The switching element SW11 is connected to the first wiring line L1_odd, a second wiring line L2_R1 for transmitting a video signal Sig_R1 to the red sub-pixel SP1 included in each pixel PX located in the odd-numbered pixel row, a selection control signal line Lsel1 for transmitting a positive control signal ASW1 output from the driver IC 5, and a selection control signal line Lxsel1 for transmitting a negative control signal xASW1 output from the driver IC 5.

The switching element SW12 is connected to the first wiring line L1_odd, a second wiring line L2_G2 for transmitting a video signal Sig_G2 to the green sub-pixel SP2 included in each pixel PX located in the even-numbered pixel row, a selection control signal line Lsel2 for transmitting a positive control signal ASW2 output from the driver IC 5, and a selection control signal line Lxsel2 for transmitting a negative control signal xASW2 output from the driver IC 5.

The switching element SW13 is connected to the first wiring line L1_odd, a second wiring L2_B1 for transmitting a video signal Sig_B1 to the blue sub-pixel SP3 included in each pixel PX located in the odd-numbered pixel row, a selection control signal line Lsel3 for transmitting a positive control signal ASW3 output from the driver IC 5, and a selection control signal line Lxsel3 for transmitting a negative control signal xASW3 output from the driver IC 5.

The switching element SW14 is connected to the first wiring line L1_odd, a second wiring line L2_FPS1 for transmitting a detection signal Vdet_FPS1 output from the optical sensor OS located in the odd-numbered pixel row, a selection control signal line Lsel4 for transmitting a positive control signal ASW4 output from the driver IC 5, and a selection control signal line Lxsel4 for transmitting a negative control signal xASW4 output from the driver IC 5.

The switching element SW21 is connected to the first wiring line L1_even, a second wiring line L2_R2 for transmitting a video signal Sig_R2 to the red sub-pixel SP1 included in each pixel PX located in the even-numbered pixel row, the selection control signal line Lsel1 described above, and the selection control signal line Lxsel1 described above.

The switching element SW22 is connected to the first wiring line L1_even, a second wiring line L2_G1 for transmitting a video signal Sig_G1 to the green sub-pixel SP2 included in each pixel PX located in the odd-numbered pixel row, the selection control signal line Lsel2 described above, and the selection control signal line Lxsel2 described above.

The switching element SW23 is connected to the first wiring line L1_even, a second wiring line L2_B2 for transmitting a video signal Sig_B2 to the blue sub-pixel SP3 included in each pixel PX located in the even-numbered pixel row, the selection control signal line Lsel3 described above, and the selection control signal line Lxsel3 described above.

The switching element SW24 is connected to the first wiring line L1_even, a second wiring line L2_FPS2 for transmitting a detection signal Vdet_FPS2 output from the optical sensor OS located in the even-numbered pixel row, the selection control signal line Lsel4 described above, and the selection control signal line Lxsel4 described above.

Figure 12:
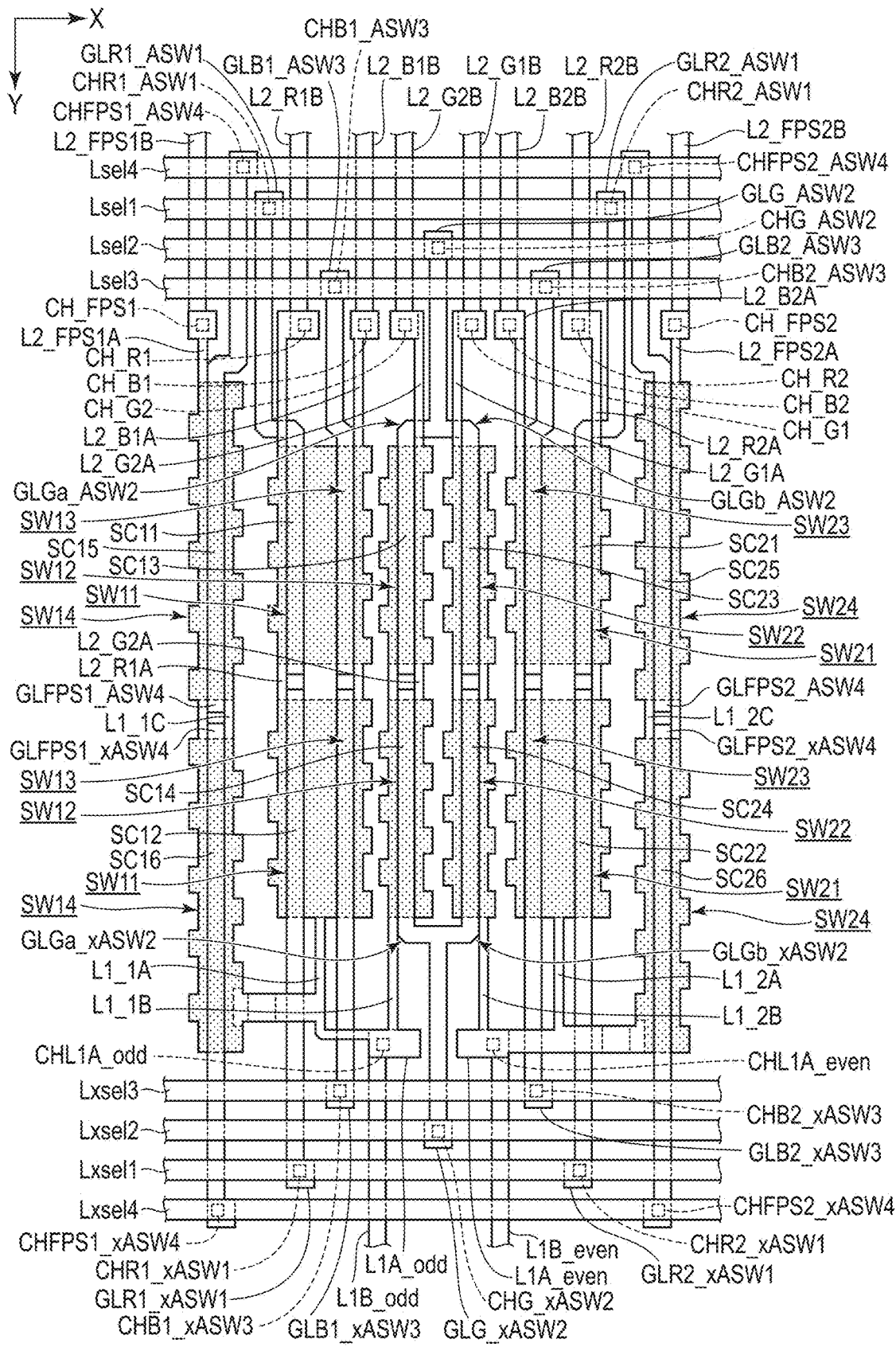
FIG. 12 is a plan view showing a schematic configuration example of a switching element shown in FIG. 11.

FIG. 12 is a plan view showing a schematic configuration example of the switching elements SW11 to SW14 and SW21 to SW24 shown in FIG. 11.

First, switching elements SW11 and SW13 are explained.

A wiring line GLR1_ASW1 serves as a gate electrode of the n-type TFT of the switching element SW11, extends along the second direction Y, and is connected to the selection control signal line Lsel1 through a contact hole CHR1_ASW1. A wiring line GLB1_ASW3 serves as a gate electrode of the n-type TFT of the switching element SW13, extends along the second direction Y, and is connected to the selection control signal line Lsel3 through a contact hole CHB1_ASW3. One semiconductor layer SC11 is arranged in an area overlapping the wiring line GLR1_ASW1 and the wiring line GLB1_ASW3 in planar view. The semiconductor layer SC11 is shared by the n-type TFTs of the switching elements SW11 and SW13. The wiring line GLR1_ASW1 and the wiring line GLB1_ASW3 are arranged adjacent to each other in an area overlapping the semiconductor layer SC11 in the first direction X.

A wiring line GLR1_xASW1 serves as a gate electrode of the p-type TFT of the switching element SW11, extends along the second direction Y, and is connected to the selection control signal line Lxsel1 through a contact hole CHR1_xASW1. A wiring line GLB1_xASW3 serves as a gate electrode of the p-type TFT of the switching element SW13, extends along the second direction Y, and is connected to the selection control signal line Lxsel3 through a contact hole CHB1_xASW3. The wiring line GLR1_xASW1 is located adjacent to the wiring line GLR1_ASW1 in the second direction Y. The wiring line GLB1_xASW3 is located adjacent to the wiring line GLB1_ASW3 in the second direction Y. One semiconductor layer SC12 is arranged in an area overlapping the wiring line GLB1_xASW1 and the wiring line GLB1_xASW3 in planar view. The semiconductor layer SC12 is shared by the p-type TFTs of the switching elements SW11 and SW13. The wiring line GLR1_xASW1 and the wiring line GLB1_xASW3 are arranged adjacent to each other in an area overlapping the semiconductor layer SC12 in the first direction X.

A second wiring line L2_R1A serves as a drain electrode of the n-type TFT of the switching element SW11 and as a source electrode of the p-type TFT of the switching element SW11. The second wiring line L2_R1A overlaps the semiconductor layers SC11 and SC12 in planar view. The second wiring line L2_R1A is arranged on a higher layer than the wiring line GLR1_ASW1 and the wiring line GLR1_xASW1 and extends in the second direction Y along the wiring line GLR1_ASW1 and the wiring line GLR1_xASW1 in planar view. The second wiring line L2_R1A is connected to a second wiring line L2_R1B arranged on the same layer as the wiring line GLR1_ASW1 and the wiring line GLR1_xASW1 through a contact hole CH R1 so as not to cross the selection control signal line Lsel. The second wiring line L2_R1B is arranged between the wiring line GLR1_ASW1 and the wiring line GLB1_ASW3 and extends along the second direction Y.

A second wiring line L2_B1A serves as a drain electrode of the n-type TFT of the switching element SW13 and as a source electrode of the p-type TFT of the switching element SW13. The second wiring line L2_B1A overlaps the semiconductor layers SC11 and SC12 in planar view. The second wiring line L2_B1A is arranged on a higher layer than the wiring line GLB1_ASW3 and the wiring line GLB1_xASW3 and extends in the second direction Y along the wiring line GLB1_ASW3 and the wiring line GLB1_xASW3 in planar view. The second wiring line L2_B1A is connected to a second wiring line L2_B1B arranged on the same layer as the wiring line GLB1_ASW3 and the wiring line GLB1_xASW3 through a contact hole CH_B1 so as not to cross the selection control signal line Lsel. The second wiring line L2_B1B is arranged between the wiring line GLB1_ASW3 and the second wiring line L2_G2B described below and extends along the second direction Y.

A first wiring line LIA odd has three branch portions L1_1A, L1_1B, and L1_1C. The branch portion L1_1A serves as a source electrode of the n-type TFT of the switching element SW11 and as a drain electrode of the p-type TFT of the switching element SW11. The branch portion L1_1A also serves as a source electrode of the n-type TFT of the switching element SW13 and a drain electrode of the p-type TFT of the switching element SW13. The branch portion L1_1A overlaps the semiconductor layers SC11 and SC12 in planar view. The branching portion L1_1A is arranged between the second wiring line L2_R1A and the second wiring line L2_B1A and extends along the second direction Y. The first wiring line LIA odd is connected to a first wiring line L1B_odd arranged on the same layer as the wiring line GLR1_xASW1 and the wiring line GLB1_xASW3 through a contact hole CHL1A_odd so as not to cross the selection control signal line Lxsel. The first wiring line L1B_odd is arranged between the wiring line GLB1_xASW3 and a wiring line GLG_xASW2 described below, and extends along the second direction Y.

Next, the switching element SW12 is described.

A wiring line GLG_ASW2 serves as a gate electrode of the n-type TFT of the switching elements SW12 and SW22, extends along the second direction Y, and is connected to the selection control signal line Lsel2 through a contact hole CHG_ASW2. The wiring line GLG_ASW2 has two U-shaped branch portions GLGa_ASW2 and GLGb_ASW2, and a semiconductor layer SC13 configuring the n-type TFT of the switching element SW12 is arranged in an area overlapping the branch portion GLGa_ASW2 in planar view. A semiconductor layer SC23 configuring the n-type TFT of the switching element SW22 is arranged in an area overlapping the branch portion GLGb_ASW2 in planar view. The two branch portions GLGa_ASW2 and GLGb_ASW2 are arranged adjacent to each other in the first direction X.

The wiring line GLG_xASW2 serves as a gate electrode of the p-type TFTs of the switching elements SW12 and SW22, extends along the second direction Y, and is connected to the selection control signal line Lxsel2 through a contact hole CHG_xASW2. The wiring line GLG_xASW2 has two U-shaped branch portions GLGa_xASW2 and GLGb_xASW2, and a semiconductor layer SC14 configuring the p-type TFT of the switching element SW12 is arranged in an area overlapping the branch portion GLGa_xASW2 in planar view. A semiconductor layer SC24 configuring the p-type TFT of the switching element SW22 is arranged in an area overlapping the branch portion GLGb_xASW2 in planar view. The two branch portions GLGa_xASW2 and GLGb_xASW2 are arranged adjacent to each other in the first direction X.

A second wiring line L2_G2A serves as a drain electrode of the n-type TFT of the switching element SW12 and as a source electrode of the p-type TFT of the switching element SW12. The second wiring line L2_G2A overlaps the semiconductor layers SC13 and SC14 in planar view. The second wiring line L2_G2A is arranged on a higher layer than the wiring line GLG_ASW2 and the wiring line GLG_xASW2 and extends in the second direction Y along the branch portion GLGa_ASW2 and the branch portion GLGa_xASW2 in planar view. The second wiring line L2_G2A is connected to the second wiring line L2_G2B arranged on the same layer as the wiring line GLG_ASW2 and the wiring line GLG_xASW2 through a contact hole CH_G2 so as not to cross the selection control signal line Lsel. The second wiring line L2_G2B is arranged between the wiring line GLG_ASW2 and the second wiring line L2_B1B and extends along the second direction Y.

The branch portion L1_1B of the first wiring line LIA odd described above serves as a source electrode of the n-type TFT of the switching element SW12 and as a drain electrode of the p-type TFT of the switching element SW12. The branch portion L1_1B overlaps the semiconductor layers SC13 and SC14 in planar view. The branch portion L1_1B is arranged between the second wiring line L2_B1A and the second wiring line L2_G2A and extends along the second direction Y.

Next, the switching element SW14 is described.

A wiring line GLFPS1_ASW4 serves as a gate electrode of the n-type TFT of the switching element SW14, extends along the second direction Y, and is connected to the selection control signal line Lsel4 through a contact hole CHFPS1_ASW4. A semiconductor layer SC15 configuring the n-type TFT of the switching element SW14 is arranged in an area overlapping the wiring line GLFPS1_ASW4 in planar view.

A wiring line GLFPS1_xASW4 serves as a gate electrode of the p-type TFT of the switching element SW14, extends along the second direction Y, and is connected to the selection control signal line Lxsel4 through a contact hole CHFPS1_xASW4. A semiconductor layer SC16 configuring the p-type TFT of the switching element SW14 is arranged in an area overlapping the wiring line GLFPS1_xASW4 in planar view.

A second wiring L2_FPS1A serves as a drain electrode of the n-type TFT of the switching element SW14 and as a source electrode of the p-type TFT of the switching element SW14. The second wiring line L2_FPS1A overlaps the semiconductor layers SC15 and SC16 in planar view. The second wiring line L2_FPS1A is arranged on a higher layer than the wiring line GLFPS1_ASW4 and the wiring line GLFPS1_xASW4, and extends in the second direction Y along the wiring line GLFPS1_ASW4 and the wiring line GLFPS1_xASW4 in planar view. The second wiring line L2_FPSIA is connected to a second wiring line L2_FPS1B arranged on the same layer as the wiring line GLFPS1_ASW4 and the wiring line GLFPS1_xASW4 through a contact hole CH_FPS1 so as not to cross the selection control signal line Lsel. The second wiring line L2_FPS1B is arranged between the wiring line GLFPS1_ASW4 and a second wiring line L2_FPS2B described below and extends along the second direction Y.

The branch portion L1_1C of the first wiring line LIA odd described above serves as a source electrode of the n-type TFT of the switching element SW14 and as a drain electrode of the p-type TFT of the switching element SW14. The branch portion L1_1C overlaps the semiconductor layers SC15 and SC16 in planar view. The branch portion L1_1C is arranged between the second wiring line L2_FPSIA and the second wiring line L2_R1A and extends along the second direction Y.

Furthermore, the switching elements SW21 and SW23 are described.

A wiring line GLR2_ASW1 serves as a gate electrode of the n-type TFT of the switching element SW21, extends along the second direction Y, and is connected to the selection control signal line Lsel1 through a contact hole CHR2_ASW1. A wiring line GLB2_ASW3 serves as a gate electrode of the n-type TFT of the switching element SW23, extends along the second direction Y, and is connected to the selection control signal line Lsel3 through a contact hole CHB2_ASW3. One semiconductor layer SC21 is arranged in an area overlapping the wiring line GLR2_ASW1 and the wiring line GLB2_ASW3 in planar view. The semiconductor layer SC21 is shared by the n-type TFTs of the switching elements SW21 and SW23. The wiring line GLR2_ASW1 and the wiring line GLB2_ASW3 are arranged adjacent to each other in an area overlapping the semiconductor layer SC21 in the first direction X.

A wiring line GLR2_xASW1 serves as a gate electrode of the p-type TFT of the switching element SW21, extends along the second direction Y, and is connected to the selection control signal line Lxsel1 through a contact hole CHR2_xASW1. A wiring line GLB2_xASW3 serves as a gate electrode of the p-type TFT of the switching element SW23, extends along the second direction Y, and is connected to the selection control signal line Lxsel3 through a contact hole CHB2_xASW3. The wiring line GLR2_xASW1 is arranged adjacent to the wiring line GLR2_ASW1 in the second direction Y. The wiring line GLB2_xASW3 is arranged adjacent to the wiring line GLB2_ASW3 in the second direction Y. One semiconductor layer SC22 is arranged in an area overlapping the wiring line GLB2_xASW1 and the wiring line GLB2_xASW3 in planar view. The semiconductor layer SC22 is shared by the p-type TFTs of the switching elements SW21 and SW23. The wiring line GLR2_xASW1 and the wiring line GLB2_xASW3 are arranged adjacent to each other in an area overlapping the semiconductor layer SC22 in the first direction X.

A second wiring line L2_R2A serves as a drain electrode of the n-type TFT of the switching element SW21 and as a source electrode of the p-type TFT of the switching element SW21. The second wiring line L2_R2A overlaps the semiconductor layers SC21 and SC22 in planar view. The second wiring line L2_R2A is arranged on a higher layer than the wiring line GLR2_ASW1 and the wiring line GLR2_xASW1 and extends in the second direction Y along the wiring line GLR2_ASW1 and the wiring line GLR2_xASW1 in planar view. The second wiring line L2_R2A is connected to a second wiring line L2_R2B arranged on the same layer as the wiring line GLR2_ASW1 and the wiring line GLR2_xASW1 through a contact hole CH R2 so as not to cross the selection control signal line Lsel. The second wiring line L2_R2B is arranged between the wiring line GLR2_ASW1 and the wiring line GLR2_ASW3 and extends along the second direction Y.

A second wiring line L2_B2A serves as a drain electrode of the n-type TFT of the switching element SW23 and as a source electrode of the p-type TFT of the switching element SW23. The second wiring line L2_B2A overlaps the semiconductor layers SC21 and SC22 in planar view. The second wiring line L2_B2A is arranged on a higher layer than the wiring line GLB2_ASW3 and the wiring line GLB2_xASW3 and extends in the second direction Y along the wiring line GLB2_ASW3 and the wiring line GLB2_xASW3 in planar view. The second wiring line L2_B2A is connected to a second wiring line L2_B2B arranged on the same layer as the wiring line GLB2_ASW3 and the wiring line GLB2_xASW3 through a contact hole CH_B2 so as not to cross the selection control signal line Lsel. The second wiring line L2_B2B is arranged between the wiring line GLB2_ASW3 and a second wiring line L2_G1B and extends along the second direction Y.

A first wiring line L1A_even has three branch portions L1_2A, L1_2B, and L1_2C. The branch portion L1_2A serves as a source electrode of the n-type TFT of the switching element SW21 and as a drain electrode of the p-type TFT of the switching element SW21. The branch portion L1_2A also serves as a source electrode of the n-type TFT of the switching element SW23 and a drain electrode of the p-type TFT of the switching element SW23. The branch portion L1_2A overlaps the semiconductor layers SC21 and SC22 in planar view. The branch portion L1_2A is arranged between the second wiring line L2_R2A and the second wiring line L2_B2A and extends along the second direction Y. The first wiring line L1_2A is connected to a first wiring line L1B_even arranged on the same layer as the wiring line GLR2_xASW1 and the wiring line GLB2_xASW3 through a contact hole CHL1_even so as not to cross the selection control signal line Lxsel. The first wiring line L1B_even is arranged between the wiring line GLB2_xASW3 and the wiring line GLG_xASW2 and extends along the second direction Y.

Furthermore, the switching element SW22 is described.

A second wiring line L2_G1A serves as a drain electrode of the n-type TFT of the switching element SW22 and as a source electrode of the p-type TFT of the switching element SW22. The second wiring line L2_G1A overlaps the semiconductor layers SC23 and SC24 in planar view. The second wiring line L2_G1A is arranged on a higher layer than the wiring line GLG_ASW2 and the wiring line GLG_xASW2 and extends in the second direction Y along the branch portion GLGb_ASW2 and the branch portion GLGb_xASW2 in planar view. The second wiring line L2_G1A is connected to the second wiring line L2_G1B arranged on the same layer as the wiring line GLG_ASW2 and the wiring line GLG_xASW2 through a contact hole CH_G1 so as not to cross the selection control signal line Lsel. The second wiring line L2_G1B is arranged between the wiring line GLG_ASW2 and the second wiring line L2_B2B and extends along the second direction Y.

The branch portion L1_2B of the first wiring line L1A_even described above serves as a source electrode of the n-type TFT of the switching element SW22 and as a drain electrode of the p-type TFT of the switching element SW22. The branch portion L1_2B overlaps the semiconductor layers SC23 and SC24 in planar view. The branch portion L1_2B is arranged between the second wiring line L2_B2A and the second wiring line L2_G1A and extends along the second direction Y.

Furthermore, the switching element SW24 is described.

A wiring line GLFPS2_ASW4 serves as a gate electrode of the n-type TFT of the switching element SW24, extends along the second direction Y, and is connected to the selection control signal line Lsel4 through a contact hole CHFPS2_ASW4. A semiconductor layer SC25 configuring an n-type TFT of the switching element SW24 is arranged in an area overlapping the wiring line GLFPS2_ASW4 in planar view.

A wiring line GLFPS2_xASW4 serves as a gate electrode of the p-type TFT of the switching element SW24, extends along the second direction Y, and is connected to the selection control signal line Lxsel4 through a contact hole CHFPS2_xASW4. A semiconductor layer SC26 configuring a p-type TFT of the switching element SW24 is arranged in an area overlapping the wiring line GLFPS2_xASW4 in planar view.

A second wiring line L2_FPS2A serves as a drain electrode of the n-type TFT of the switching element SW24 and as a source electrode of the p-type TFT of the switching element SW24. The second wiring line L2_FPS2A overlaps the semiconductor layers SC25 and SC26 in planar view. The second wiring line L2_FPS2A is arranged on a higher layer than the wiring line GLFPS2_ASW4 and the wiring line GLFPS2_xASW4, and extends in the second direction Y along the wiring line GLFPS2_ASW4 and the wiring line GLFPS2_xASW4 in planar view. The second wiring line L2_FPS2A is connected to the second wiring line L2_FPS2B arranged on the same layer as the wiring line GLFPS2_ASW4 and the wiring line GLFPS2_xASW4 through a contact hole CH_FPS2 so as not to cross the selection control signal line Lsel. The second wiring line L2_FPS2B is arranged between the wiring line GLFPS2_ASW4 and the second wiring line L2_FPS1B corresponding to an adjacent odd-numbered pixel row not shown in FIG. 12, and extends along the second direction Y.

The branch portion L1_2C of the first wiring line L1A_even described above serves as a source electrode of the n-type TFT of the switching element SW24 and as a drain electrode of the p-type TFT of the switching element SW24. The branch portion L1_2C overlaps the semiconductor layers SC25 and SC26 in planar view. The branch portion L1_2C is arranged between the second wiring line L2_FPS2A and the second wiring line L2_R2A and extends along the second direction Y.

Figure 13:
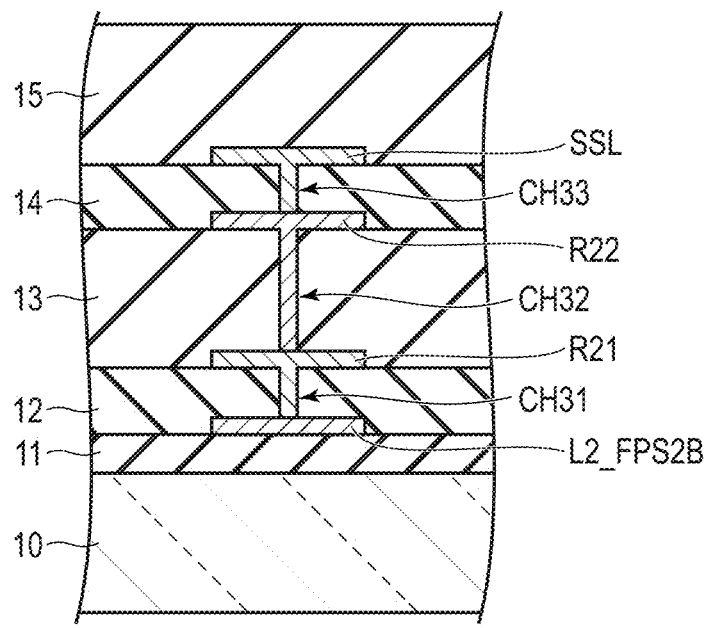
FIG. 13 is a cross-sectional view showing a schematic configuration example of a portion where a second wiring line shown in FIG. 12 is electrically connected to a sensor signal line.

FIG. 13 is a cross-sectional view showing a schematic configuration example of a portion where the second wiring line L2_FPS2B shown in FIG. 12 is electrically connected to the sensor signal line SSL.

As shown in FIG. 13, the second wiring line L2_FPS2B is arranged between the insulating layers 11 and 12, that is, on the same layer as the scanning line GL. A relay electrode R21 is arranged between the insulating layers 12 and 13, that is, on the same layer as the signal line SL, and is in contact with the second wiring line L2_FPS2B through a contact hole CH31 that penetrates the insulating layer 12. A relay electrode R22 is arranged between the insulating layers 13 and 14, that is, on the same layer as the optical sensor OS, and is in contact with the relay electrode R21 through a contact hole CH32 that penetrates the insulating layer 13. The sensor signal line SSL is arranged between the insulating layers 14 and 15, that is, on the same layer as the first power feeding line SPL1 and the second power feeding line SPL2, and is in contact with the relay electrode R22 through a contact hole CH33 that penetrates the insulating layer 14. According to this, the second wiring line L2_FPS2B is electrically connected to the sensor signal line SSL, and the detection signal Vdet (detection signal Vdet_FPS2) output from the optical sensor OS passes through the sensor signal line SSL, the second wiring line L2_FPS2B, the second wiring line L2_FPS2A, the first wiring lines L1A_even and L1B_even, and output to the driver IC 5.

Note that, in FIG. 13, the portion where the second wiring line L2_FPS2B and the sensor signal line SSL (more specifically, the sensor signal line SSL corresponding to the optical sensor OS located in the even-numbered pixel row) are electrically connected is described, but the same applies to a portion where the second wiring line L2_FPS1B and the sensor signal line SSL (more specifically, the sensor signal line SSL corresponding to the optical sensor OS located in the odd-numbered pixel row) are electrically connected.

Figure 14:
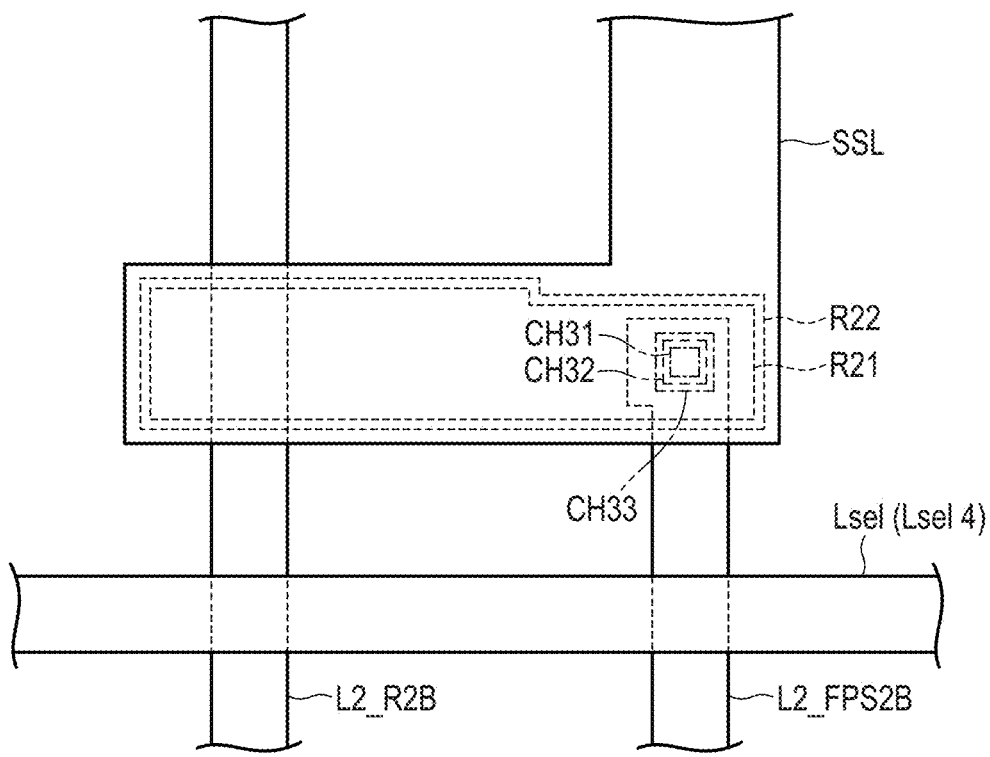
FIG. 14 is a plan view showing a schematic configuration example of the portion where the second wiring line shown in FIG. 12 is electrically connected to the sensor signal liner.

FIG. 14 is a plan view showing a schematic configuration example of the portion where the second wiring line L2_FPS2B shown in FIG. 12 is electrically connected to the sensor signal line SSL.

The second wiring line L2_FPS2B is drawn from the contact hole CH_FPS2 shown in FIG. 12 to the contact hole CH31 shown in FIG. 14, passing under the selection control signal line Lsel (Lsel4). The second wiring line L2_FPS2B is connected to the island-shaped relay electrode R21 through the contact hole CH31. The relay electrode R21 is connected to the island-shaped relay electrode R22 through the contact hole CH32. The relay electrode R22 is connected to the sensor signal line SSL through the contact hole CH33. The sensor signal line SSL extends to the display area DA and is electrically connected to the corresponding optical sensor OS. The second wiring line L2_FPS2B is adjacent to the second wiring line L2_R2B in the first direction X closer to the display area DA than the selection control signal line Lsel. The relay electrodes R21 and R22 and the sensor signal line SSL overlap the second wiring line L2_R2B in planar view.

Note that, in FIG. 14, the portion where the second wiring line L2_FPS2B and the sensor signal line SSL (more specifically, the sensor signal line SSL corresponding to the optical sensor OS located in the even-numbered pixel row) are electrically connected is described, but the same applies to the portion where the second wiring line L2_FPS1B and the sensor signal line SSL (more specifically, the sensor signal line SSL corresponding to the optical sensor OS located in the odd-numbered pixel row) are electrically connected.

In the following, the effect of the display device DSP according to the present embodiment will be explained using a comparative example. Note that the comparative example is intended to illustrate some of the effects that the display device DSP according to the present embodiment can achieve, and the configuration and effects common to the present embodiment and the comparative example are not excluded from the scope of the present invention.

Figure 15:
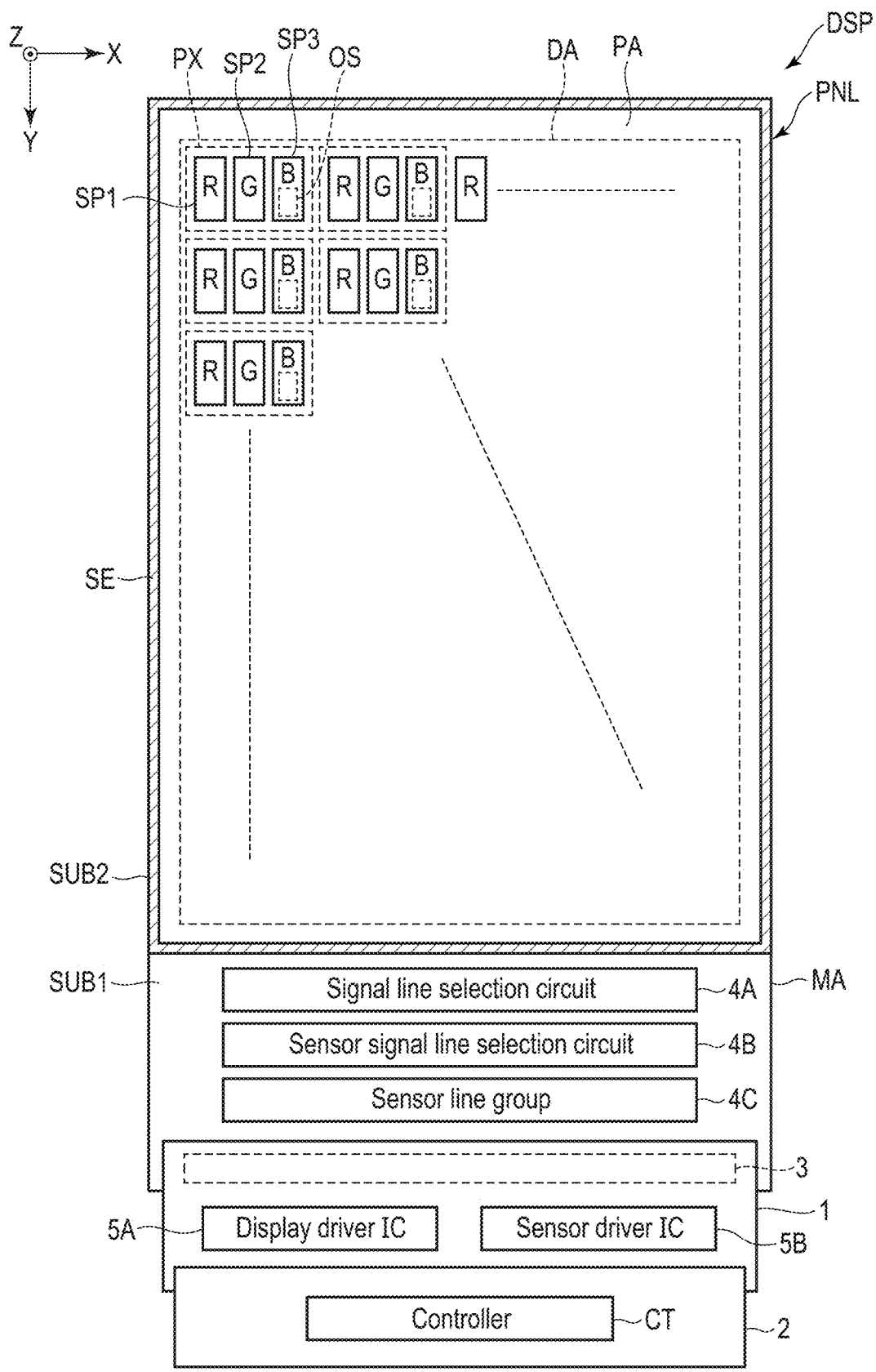
FIG. 15 is a plan view schematically showing a display device according to a comparative example.

FIG. 15 is a plan view schematically showing a display device DSP1 according to the comparative example. The display device DSP1 according to the comparative example differs from the display device DSP according to the present embodiment in that two drivers IC 5A and 5B are provided on a first flexible printed circuit board 1. The driver IC 5A corresponds to a display mode and a touch sensing mode, and the driver IC 5B corresponds to a detection operation by the optical sensor OS. The display device DSP1 according to the comparative example differs from the display device DSP according to the present embodiment in that a signal line selection circuit 4A connected to the driver IC 5A and a sensor signal line selection circuit 4B and a sensor line group 4C connected to the driver IC 5B are provided in a mounting area MA.

Figure 16A:
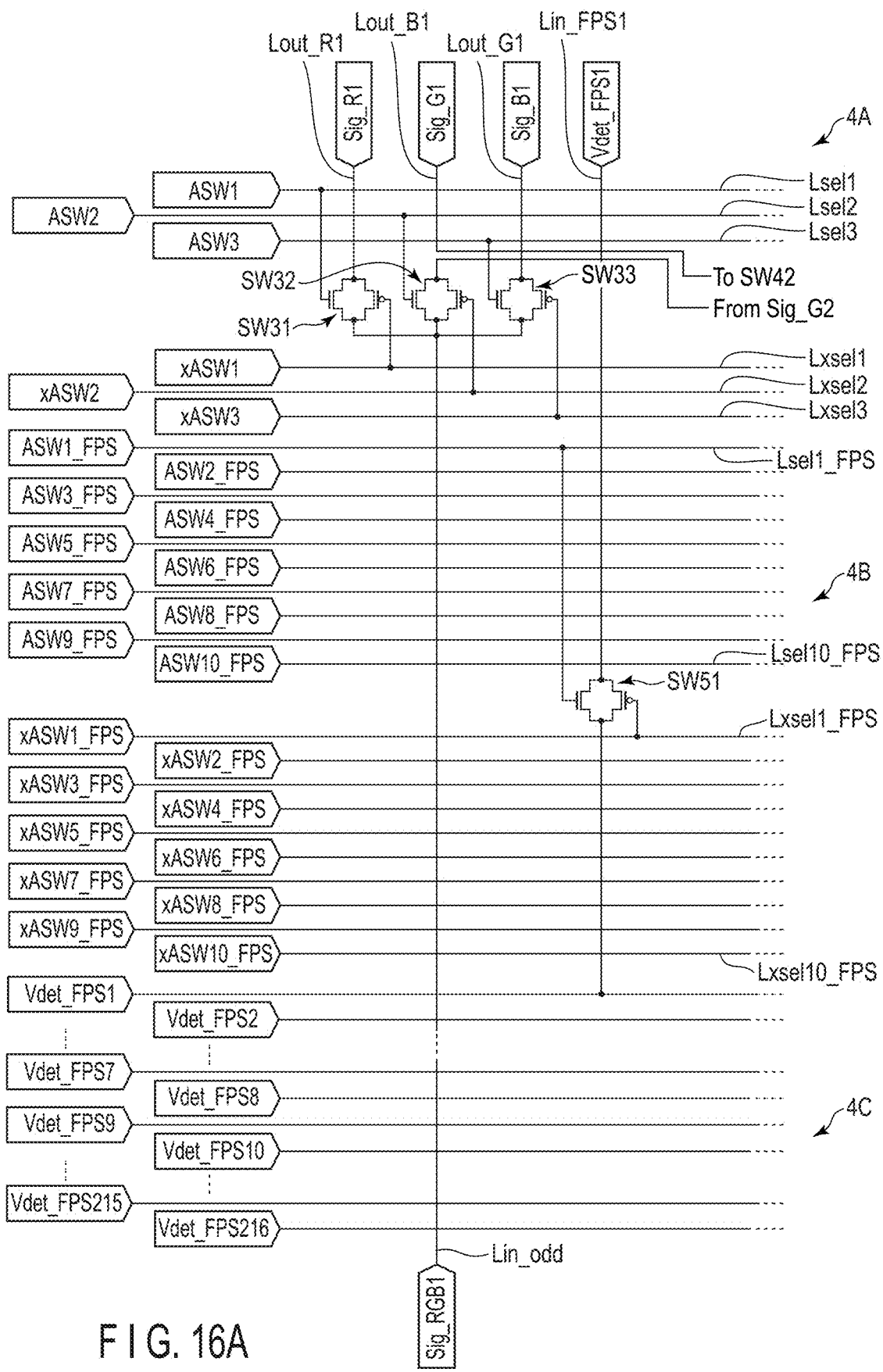
FIG. 16A is a circuit diagram showing a signal line selection circuit, a sensor signal line selection circuit, and a sensor line group shown in FIG. 15.
Figure 16B:
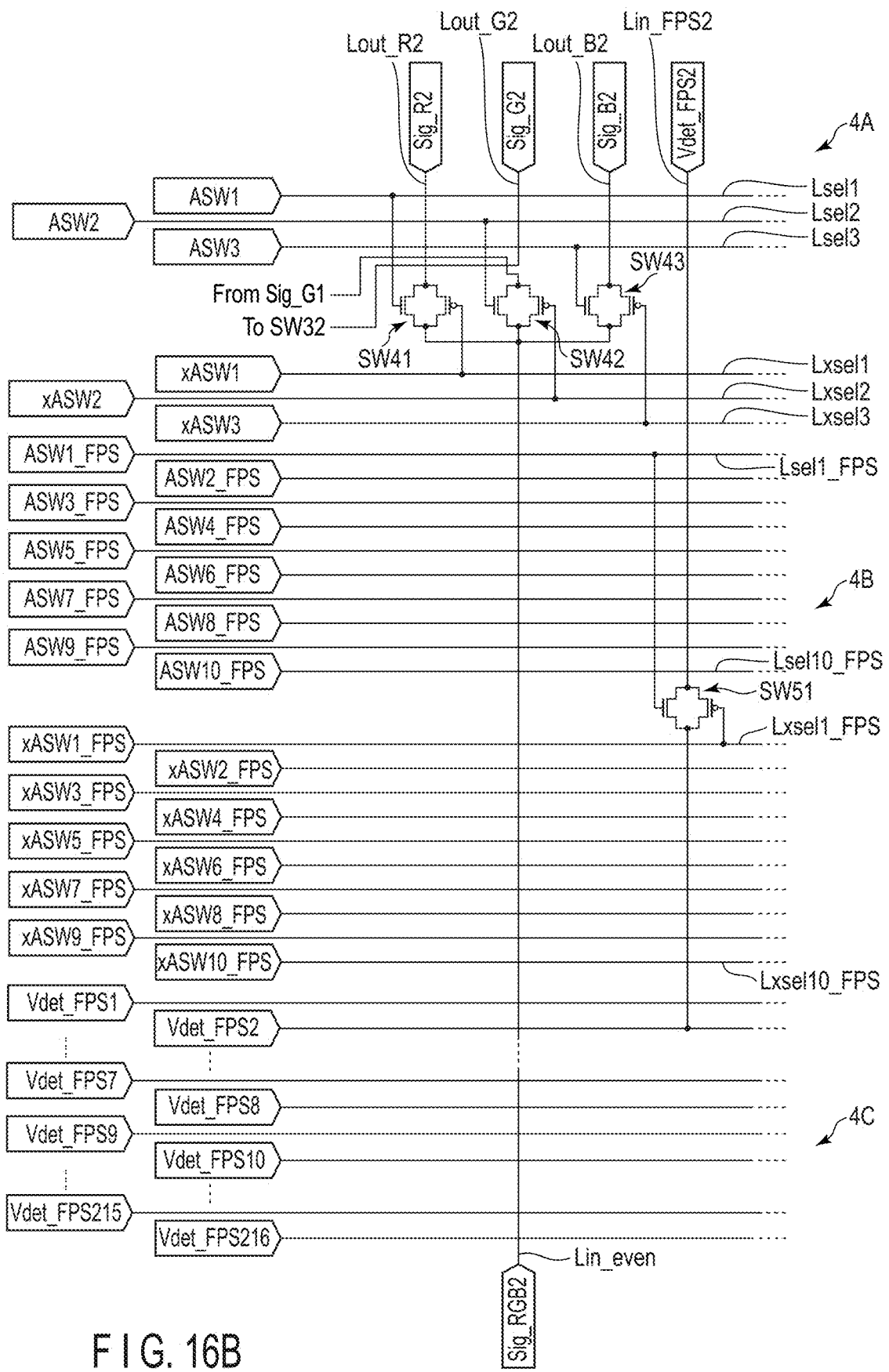
FIG. 16B is a circuit diagram showing a signal line selection circuit, a sensor signal line selection circuit, and a sensor line group shown in FIG. 15.

FIG. 16A and FIG. 16B are a circuit diagram showing the signal line selection circuit 4A, the sensor signal line selection circuit 4B, and the sensor line group 4C shown in FIG. 15.

As shown in FIGS. 16A and 16B, in the signal line selection circuit 4A, three output wiring lines Lout_R, Lout_G, and Lout_B are provided for one input wiring line Lin. The input wiring line Lin is a wiring line provided for each pixel row. The input wiring line Lin is used to transmit a video signal Sig_RGB output from the driver IC 5A in the display mode.

In the signal line selection circuit 4A, three switching elements are provided for one input wiring line Lin. More specifically, three switching elements SW31 to SW33 are provided for one input wiring line Lin_odd corresponding to an odd-numbered pixel row, and three switching elements SW41 to SW43 are provided for one input wiring line Lin even corresponding to an even-numbered pixel row. The switching elements SW31 to SW33 and SW41 to SW43 have n-type TFT and p-type TFT, respectively. The switching elements SW31 to SW33 and SW41 to SW43 are each connected to one of three selection control signal lines Lsel1 to Lsel3 that transmit a positive control signal ASW and one of three selection control signal lines Lxsel1 to Lxsel3 that transmit a negative control signal xASW.

In the sensor signal line selection circuit 4B, one switching element SW51 is provided for one input wiring line Lin FPS. The switching element SW51 provided in the same number as the input wiring line Lin FPS each have an n-type TFT and a p-type TFT. Each of these switching elements SW51 is connected to one of ten selection control signal lines Lsel1_FPS to Lsel10_FPS that transmit a positive control signal ASW FPS and one of ten selection control signal lines Lxsel1_FPS to Lxsel10_FPS that transmit a negative control signal xASW_FPS.

Each output wiring line Lout_sw51 of the switching element SW51 included in the sensor signal line selection circuit 4B is connected to one of 216 sensor lines Lout_FPS1 to Lout_FPS216 included in the sensor line group 4C. A detection signal Vdet output from an optical sensor OS is output to the driver IC 5B through the sensor signal line selection circuit 4B and the sensor line group 4C.

As shown in FIG. 15 and FIGS. 16A and 16B, the display device DSP1 according to the comparative example comprises two drivers IC 5A and 5B. Therefore, in the mounting area MA of the display device DSP1 according to the comparative example, since it is necessary to provide the signal line selection circuit 4A connected to the driver IC 5A and the sensor signal line selection circuit 4B and the sensor line group 4C connected to the driver IC 5B, it is difficult to make a narrow frame. Specifically, to provide the signal line selection circuit 4A, a space of about 205 μm is required in the second direction Y. To provide the sensor signal line selection circuit 4B, a space of about 310 μm is required in the second direction Y. To provide the sensor line group 4C, a space of about 1765 μm is required in the second direction Y. In other words, the display device DSP1 according to the comparative example requires at least 2280 μm of space in the second direction Y (=205+310+1765 [μm]).

In contrast, in the display device DSP according to the present embodiment, the number of drivers IC is one, and only the signal line/sensor signal line selection circuit 4 that is connected to the driver IC 5 needs to be provided in the mounting area MA. Therefore, it is possible to reduce the mounting area MA compared to the display device DSP1 according to the comparative example. Specifically, in order to provide the signal line/sensor signal line selection circuit 4, a space of approximately 240 μm in the second direction Y is sufficient, thereby significantly reducing the mounting area MA compared to the display device DSP1 according to the comparative example. According to this, a narrow frame can be achieved.

Also, in the signal line/sensor signal line selection circuit 4 according to the present embodiment, since the semiconductor layers SC11 and SC12 are shared by the switching element SW11 corresponding to the red sub-pixel SP1 included in each pixel PX located in the odd-numbered pixel row and the switching element SW13 corresponding to the blue sub-pixel SP3 included in each pixel PX located in the odd-numbered pixel row, it is possible to save space and achieve a narrower frame compared to a case where semiconductor layers are provided separately. Similarly, in the signal line/sensor signal line selection circuit 4 according to the present embodiment, since the semiconductor layers SC21 and SC22 are shared by the switching element SW21 corresponding to the red sub-pixel SP1 included in each pixel PX located in the even-numbered pixel row and the switching element SW23 corresponding to the blue sub-pixel SP3 included in each pixel PX located in the even-numbered pixel row, it is possible to save space compared to a case where semiconductor layers are provided separately, and achieve a narrow frame.

Furthermore, since the display device DSP according to the present embodiment has only one driver IC, it is possible to align the center of the driver IC 5 with the center of the display panel PNL, and then arrange the driver IC 5 on the first flexible printed circuit board 2. This allows the various wiring lines connected to the driver IC 5 to be drawn symmetrically, which saves space compared to a case where the center of a driver IC and the center of a display panel are not aligned, as in, for example, the display device DSP1 according to the comparative example, and achieves a narrow frame.

According to one embodiment described above, it is possible to provide a liquid crystal display device with an optical sensor that can realize a narrow frame.

Note that, in the present embodiment, the display device DSP is described as a liquid crystal display device with an illumination device BL. However, the display device DSP is not limited to this and may be an organic electroluminescent display device with an organic light emitting diode (OLED) as a display element.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. A display device comprising:
a first substrate;
a driver IC; and
a first signal line supplying video signals to a first sub-pixel, a second signal line supplying video signals to a second sub-pixel, and a third signal line supplying video signals to a third sub-pixel, wherein
one first wiring line drawn from one terminal of the driver IC is connected to three switching elements,
the three switching elements are electrically connected to one of the first signal line, the second signal line, and the third signal line, respectively,
two of the three switching elements electrically connected to the first signal line and the third signal line share one semiconductor layer,
the three switching elements each include an n-type semiconductor and a p-type semiconductor,
n-type semiconductors of two of the three switching elements electrically connected to the first signal line and the third signal line share one first semiconductor layer, and
p-type semiconductors of two of the three switching elements electrically connected to the first signal line and the third signal line share one second semiconductor layer.

2. The display device of claim 1, wherein
the first sub-pixel corresponds to red,
the second sub-pixel corresponds to green, and
the third sub-pixel corresponds to blue.

3. The display device of claim 1, wherein
the first signal line, the second signal line, and the third signal line are aligned along a first direction and extend along a second direction intersecting the first direction, and
a side extending along the second direction of a semiconductor layer, which is arranged in each of the three switching elements, has a concavo-convex shape.

4. The display device of claim 3, wherein
at least one of a gate electrode and a drain electrode of n-type semiconductor in each of the three switching elements has a concavo-convex shape overlapping the concavo-convex shape of the semiconductor layer in plan view, and
at least one of a gate electrode and a drain electrode of p-type semiconductor in each of the three switching elements has a concavo-convex shape overlapping the concavo-convex shape of the semiconductor layer in plan view.

5. The display device of claim 1, wherein
at least one of a gate electrode and a drain electrode of n-type semiconductor in each of the three switching elements has a concavo-convex shape, and
at least one of a gate electrode and a drain electrode of p-type semiconductor in each of the three switching elements has a concavo-convex shape.

6. The display device of claim 1, wherein
among two control signal lines transmitting control signals to drive the n-type semiconductor and the p-type semiconductor arranged in each of the three switching elements, one of the control signal lines is arranged between the three switching elements and the driver IC, and the other control signal line is arranged between the three switching elements and a display area.

7. The display device of claim 1, wherein
a center of the driver IC is aligned with a center of the first substrate.

8. The display device of claim 1, further comprising:
an optical sensor comprising a photoelectric conversion element that outputs a detection signal in response to incident light.

9. The display device of claim 8, wherein
the one first wiring line:
transmits the video signals to the first signal line, the second signal line, and the third signal line in a case that the driver IC is in a display mode for displaying images, and
transmits the detection signal to the driver IC in a case that the driver IC is in a detection mode for detecting biometric information.

10. The display device of claim 8, wherein
a center of the driver IC is aligned with a center of the first substrate.

11. The display device of claim 8, wherein
the optical sensor includes:
the photoelectric conversion element;
a first electrode in contact with a lower surface of the photoelectric conversion element and formed of a metallic material; and
a second electrode in contact with an upper surface of the photoelectric conversion element and formed of a transparent conductive material.

* * * * *